United States Patent [19]

Amano

[11] Patent Number: 5,079,637
[45] Date of Patent: Jan. 7, 1992

[54] APPARATUS FOR REPRODUCING COLOR VIDEO SIGNAL RECORDED BY TCI SIGNAL FORMAT

[75] Inventor: Kunihiko Amano, Yokohama, Japan

[73] Assignee: Kabushiki Kaisha Toshiba, Kawasaki, Japan

[21] Appl. No.: 323,396

[22] Filed: Mar. 14, 1989

[30] Foreign Application Priority Data

Mar. 16, 1988 [JP] Japan ............................... 63-60247
Mar. 28, 1988 [JP] Japan ............................... 63-73794
Mar. 28, 1988 [JP] Japan ............................... 63-73798

[51] Int. Cl.$^5$ .............................................. H04N 9/79
[52] U.S. Cl. .................................. 358/310; 358/312; 360/10.1; 360/10.3
[58] Field of Search ............... 358/310, 312, 320, 323, 358/313, 327, 328, 324, 325, 326, 330; 360/9.1, 10.1, 10.3, 11.1, 33.1, 22, 64, 84

[56] References Cited

U.S. PATENT DOCUMENTS

| | | | |
|---|---|---|---|
| 4,733,311 | 3/1988 | Yoshinaka | 358/320 |
| 4,775,897 | 10/1988 | Umemoto et al. | 358/310 |
| 4,893,587 | 10/1989 | Yoshimura et al. | 360/9.1 |
| 4,916,553 | 4/1990 | Yoshioka et al. | 360/9.1 |

FOREIGN PATENT DOCUMENTS 52-9320 1/1977 Japan .

*Primary Examiner*—Roy N. Envall, Jr.
*Assistant Examiner*—Thai Tran
*Attorney, Agent, or Firm*—Oblon, Spivak, McClelland, Maier & Neustadt

[57] ABSTRACT

An apparatus for reproducing a color video signal recorded in a recording medium by a time compressed integration signal format in a luminance signal, one of two types of chrominance signals being selected by a predetermined rule in every horizontal scanning period, and a chrominance index signal representing the type of the selected one of chrominance signals are multiplexed along a time base, includes at least two cascade-connected 1H delay circuits for delaying at least the chrominance signal in a signal reproduced from the recording medium, an extraction circuit for extracting the chrominance index signal from the reproduced signal, at least two cascade-connected latches, connected to an output of the extraction circuit, for holding extracted the chrominance index signals respectively corresponding to output signals from the 1H delay circuits, an identification circuit for identifying the type of chrominance signal supposed to appear in each horizontal scanning period of the reproduced signal, and a selector for selecting one of the reproduced signal and the output signals from the 1H delay circuits in response to a combination of an output signal from the identification circuit and output signals from the latches so as to cause the identified type of chrominance signal to appear in the horizontal scanning period of the selected output signal.

13 Claims, 19 Drawing Sheets

1st SCANNING

| 1 | 4 | 7 | 10 | 13 | | m-13 | m-10 | m-7 | m-4 | m-1 |
|---|---|---|----|----|---|------|------|-----|-----|-----|
| CW | CN | CW | CN | CW | | CN | CW | CN | CW | CN |

|←————— ① —————|————— ② —————→|

2nd SCANNING

| 3 | 6 | 9 | 12 | 15 | | m-14 | m-11 | m-8 | m-5 | m-2 |
|---|---|---|----|----|---|------|------|-----|-----|-----|
| CW | CN | CW | CN | CW | | CN | CW | CN | CW | CN |

|←————— ③ —————|————— ④ —————→|

3rd SCANNING

| 2 | 5 | 8 | 11 | 14 | | m-12 | m-9 | m-6 | m-3 | m |
|---|---|---|----|----|---|------|-----|-----|-----|---|
| CW | CN | CW | CN | CW | | CN | CW | CN | CW | CN |

|←————— ⑤ —————|————— ⑥ —————→|

F I G. 5

| LINE NO. | 1 | 2 | 3 | 4 | 5 | 6 | 7 | 8 | 9 | 10 | 11 | 12 | --- |
|----------|---|---|---|---|---|---|---|---|---|----|----|----|-----|
| C SIGNAL | CW | CW | CW | CN | CN | CN | CW | CW | CW | CN | CN | CN | --- |

|←— CW —|— CN —|— CW —|— CN —|

F I G. 6

|    | C1  | C2  | C3  | cout | C4             |
| -- | --- | --- | --- | ---- | -------------- |
| 1  | $C_W$ | $C_W$ | $C_W$ | $C_W$ | C1 or C2 or C3 |
| 2  | "   | "   | "   | $C_N$ | —              |
| 3  | $C_W$ | $C_W$ | $C_N$ | $C_W$ | C1 or C2       |
| 4  | "   | "   | "   | $C_N$ | C3             |
| 5  | $C_W$ | $C_N$ | $C_W$ | $C_W$ | C1 or C3       |
| 6  | "   | "   | "   | $C_N$ | C2             |
| 7  | $C_W$ | $C_N$ | $C_N$ | $C_W$ | C1             |
| 8  | "   | "   | "   | $C_N$ | C2 or C3       |
| 9  | $C_N$ | $C_W$ | $C_W$ | $C_W$ | C2 or C3       |
| 10 | "   | "   | "   | $C_N$ | C1             |
| 11 | $C_N$ | $C_W$ | $C_N$ | $C_W$ | C2             |
| 12 | "   | "   | "   | $C_N$ | C1 or C3       |
| 13 | $C_N$ | $C_N$ | $C_W$ | $C_W$ | C3             |
| 14 | "   | "   | "   | $C_N$ | C1 or C2       |
| 15 | $C_N$ | $C_N$ | $C_N$ | $C_W$ | —              |
| 16 | "   | "   | "   | $C_N$ | C1 or C2 or C3 |

FIG. 10

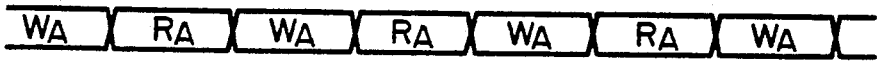
FIG. 13

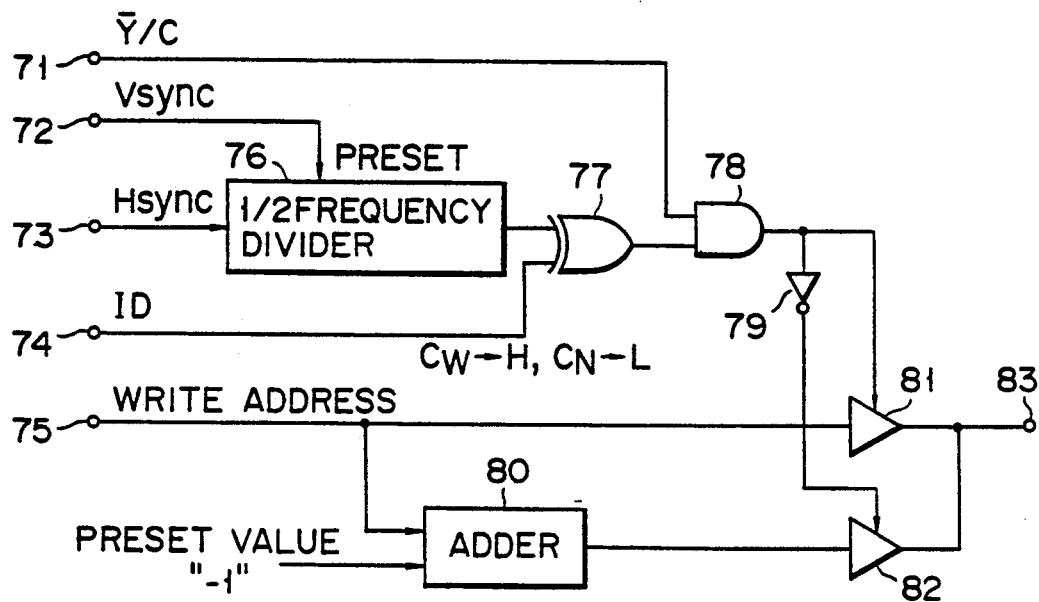
FIG. 14
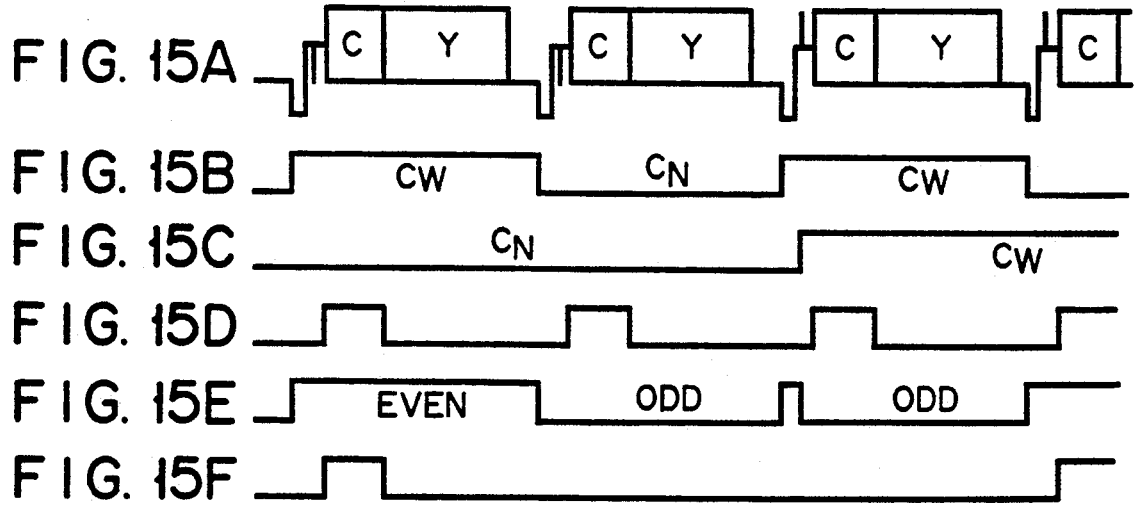
FIG. 15A
FIG. 15B
FIG. 15C
FIG. 15D
FIG. 15E
FIG. 15F

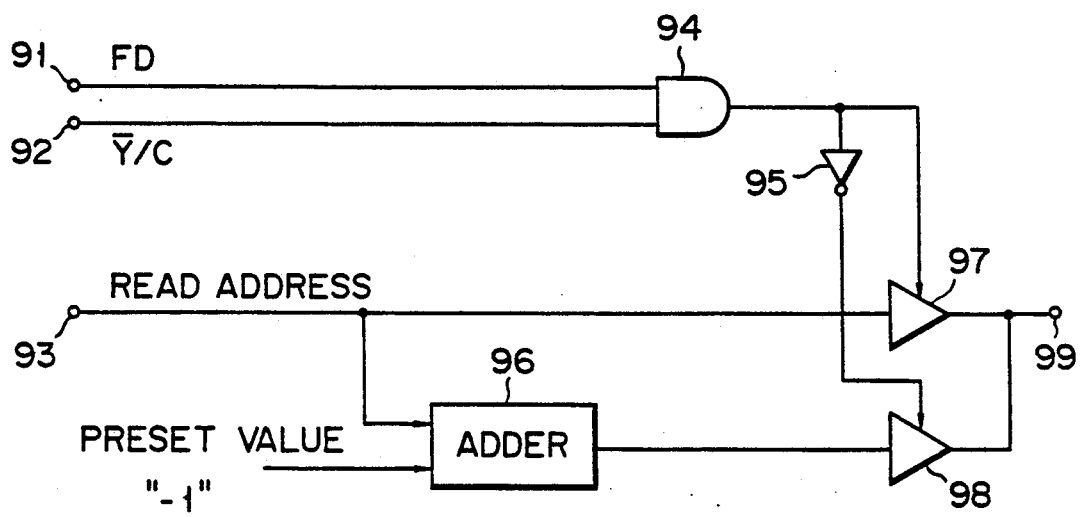
FIG. 16

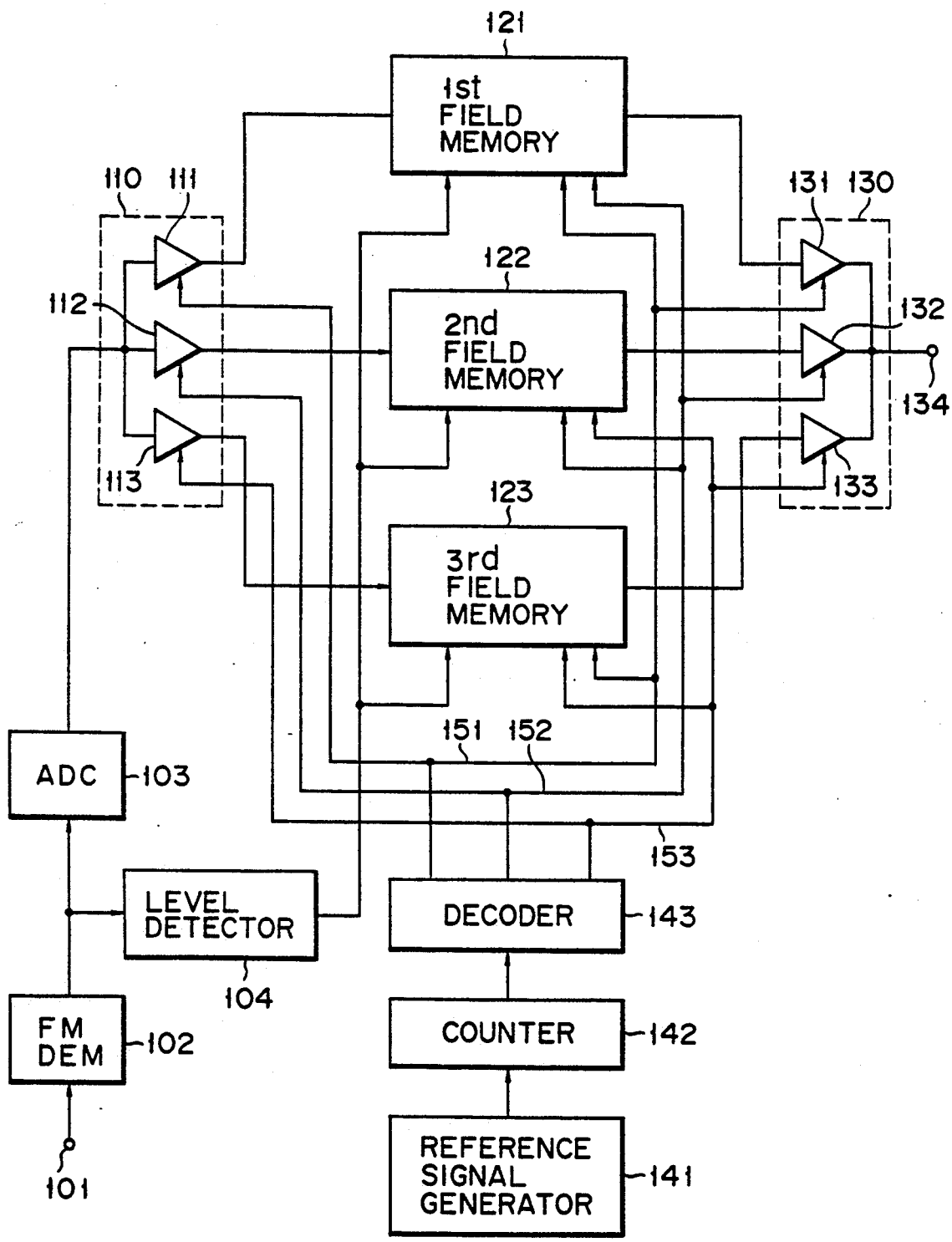
F I G. 18

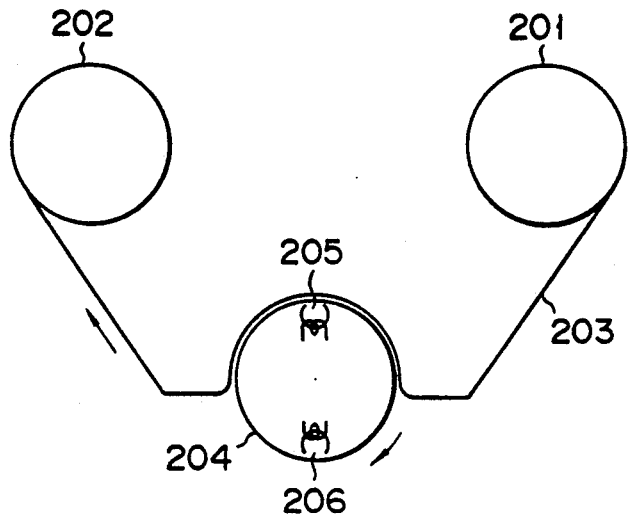
FIG. 19
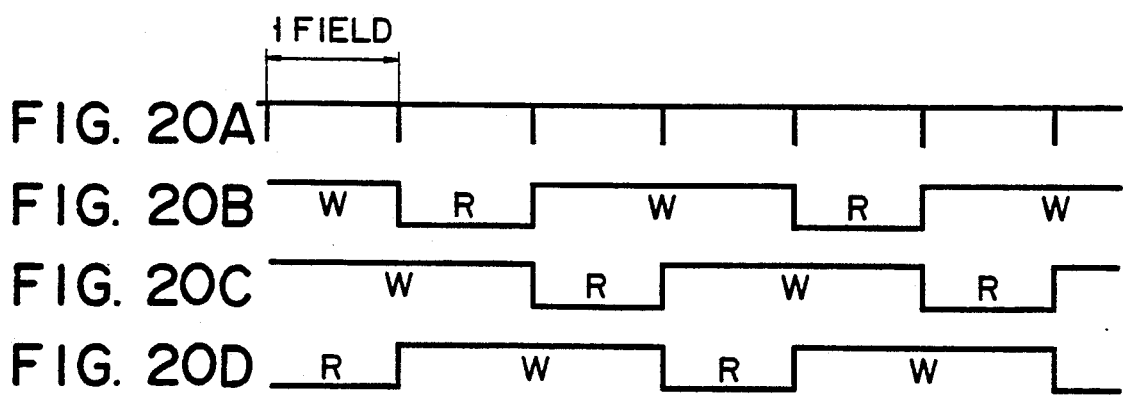

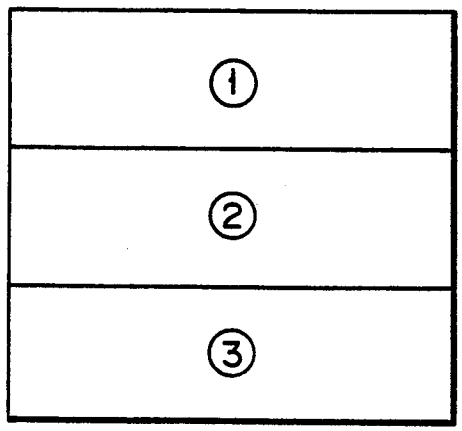
F I G. 24
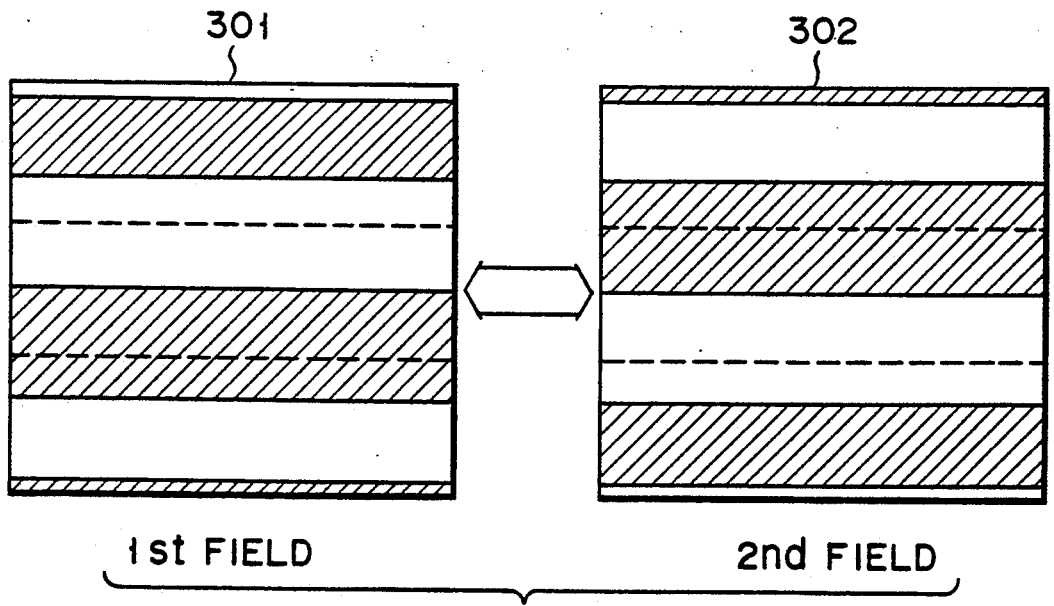
F I G. 25

APPARATUS FOR REPRODUCING COLOR VIDEO SIGNAL RECORDED BY TCI SIGNAL FORMAT

BACKGROUND OF THE INVENTION

1. Field of the Invention

The present invention relates to an apparatus for reproducing a color video signal and, more particularly, to an apparatus for reproducing a color video signal recorded in a recording medium by a TCI (time compressed integration) signal format.

2. Description of the Related Art

A TCI system has received a great deal of attention as a recording system suitable for improving image quality in a VTR (video tape recorder) and a video disk system. According to a TCI system, a luminance signal (Y signal) and chrominance signals (C signals) are multiplexed within a 1H period (one horizontal scanning period) along the time base, as shown in FIG. 1. The TCI signal is essentially free from interference between the luminance and chrominance signals, unlike an NTSC signal. In the TCI system, in order to transmit the chrominance signals through one channel instead of two originally channels. In practice, as shown in FIG. 1, the chrominance signals had been classified into two types of chrominance signal (color difference signals), i.e., a wide-band chrominance signal ($C_W$ signal) and a narrow-band chrominance signal ($C_N$ signal). These two chrominance signals are selected by a predetermined rule (e.g., alternately selected every horizontal scanning period) every horizontal scanning period and inserted in a TCI signal in accordance with a so-called color line sequential scheme.

In order to accurately extract the chrominance signal from the TCI signal of the color line sequential scheme, the line sequential order of the chrominance signals in the TCI signal must be appropriately maintained (e.g., the $C_W$ and $C_N$ signals alternately appear every horizontal scanning period). However, in a helical scan type VTR for recording a color video signal by a TCI signal format using a color line sequential scheme, the line sequential order of the chrominance signals is not often maintained in a special reproduction mode such as a still reproduction mode and a slow motion reproduction mode in which a tape speed is different from that during recording. This problem will be described with reference to FIGS. 2, 3, and 4 in which a segment recording scheme suitable for recording a wide-band video signal such as a high-quality television signal is exemplified.

In the segment recording scheme, a one-field video signal is divided into a plurality of segments (e.g., three segments), as shown in FIG. 2. These segments are divided into different tracks, and information is recorded in these tracks, as shown in FIG. 3. A scan trace of a magnetic head upon reproduction of the recorded signal at a tape travel speed twice the recording speed is indicated by broken lines in FIG. 3. In this case, as shown in FIG. 4, signals of segments ① and ②, signals of segments ③ and ④, and signals of segments ⑤ and ⑥ are obtained as reproduced signals in the first, second, and third scanning cycles in FIG. 3, respectively. The contents of the chrominance signals in the signals reproduced by the respective scanning cycles are shown in FIG. 5. As shown in FIG. 2, all segment chrominance signals alternately appear as $C_W$ and $C_N$ signals. However, the order of the $C_W$ and $C_N$ signals in an odd segment is opposite to that in an even segment. These reproduced signals are reordered in an order of horizontal scanning line numbers, identical chrominance signals continue for a 3H period, as shown in FIG. 6. Therefore, the correct line sequential order cannot be maintained.

When special reproduction described above is performed in a helical scan VTR, a noise bar appears on the screen. In order to eliminate noise, in a general VTR of a non-segment recording scheme for recording a one-field video signal in one track, as disclosed in Japanese Patent Disclosure (Kokai) No. 60-117885, when information is reproduced upon traveling of the tape at a speed in an even multiple of the recording speed, interfield (between the odd and even fields) interpolation of a reproduced signal is performed. However, this technique cannot be directly applied to the segment recording scheme.

SUMMARY OF THE INVENTION

It is a first object of the present invention to provide an apparatus for reproducing a color video signal recorded in a recording medium by a TCI signal format, wherein line sequential chrominance signals can be obtained even in a special reproduction mode.

It is a second object of the present invention to provide a video reproduction apparatus in a VTR of a segment recording scheme, in which a good image free from a noise bar can be obtained even in a special reproduction mode.

In order to achieve the first object according to an aspect of the present invention, there is provided an apparatus for reproducing a color video signal recorded in a recording medium by a time compressed integration signal format in a luminance signal, one of two types of chrominance signals being selected by a predetermined rule every horizontal scanning period, and a chrominance index signal representing the type of the selected one chrominance signals are multiplexed along a time base, comprising: at least two cascade-connected 1H (one horizontal scanning period) delay circuits for delaying at least the chrominance signal in a signal reproduced from the recording medium; an extraction circuit for extracting the chrominance index signal from the reproduced signal; at least two cascade-connected latches, connected to an output of the extraction circuit, for holding extracted the chrominance index signal corresponding to output signals from the 1H delay circuits; an identification circuit for identifying the type of chrominance signal supposed to appear in each horizontal scanning period of the reproduced signal; and a selector for selecting one of the reproduced signal and the output signals from the 1H delay circuits in response to a combination of an output signal from the identification circuit and output signals from the latches so as to cause the identified type of chrominance signal to appear in the horizontal scanning period of the selected output signal.

In order to achieve the first object according to another aspect of the present invention, there is provided an apparatus for reproducing a color video signal recorded on a recording medium, comprising: a memory for storing at least one field of a signal reproduced from the recording medium; a circuit for writing the reproduced signal in the memory; a write address correction circuit for performing correction for shifting a write address of a chrominance signal in the reproduced signal of one of odd and even fields from a write address of a chrominance signal in the reproduced signal of the other field by a predetermined amount when the reproduced signal is written in the memory; a circuit for reading out the reproduced signal from the memory; and a read address correction circuit for performing correction for shifting a read address of a chrominance signal in the reproduced signal of one of the odd and even fields from a read address of a chrominance signal of the reproduced signal of the other field by a predetermined amount when the reproduced signal is read out from the memory.

In order to achieve the first object according to still another aspect of the present invention, there is provided an apparatus for reproducing a color video signal recorded in a recording medium, comprising: an identification circuit for identifying a type of chrominance signal supposed to appear during each horizontal scanning period of a signal reproduced from the recording medium; a determination circuit for determining a coincidence/noncoincidence between a type of chrominance signal of the reproduced signal which is represented by the chrominance index signal and the type of chrominance signal identified by the identification circuit; and a circuit for correcting the chrominance signal in the reproduced signal so as to obtain the type of chrominance signal identified by the identification circuit during each horizontal scanning period of the corrected chrominance signal when the determination circuit determines the noncoincidence.

In order to achieve the second object according to an aspect of the present invention, there is provided an apparatus for reproducing video signals obtained by dividing a one-field video signal and recorded in l (l is an integer of 2 or more) tracks by a rotary head while a tape-like recording medium driven at a predetermined speed is driven at a speed $\underline{n}$ ($\underline{n}$ is $|n| > 1$) times a recording speed, comprising: a detector for detecting an amplitude of a signal reproduced from the recording medium; and a synthesizer for synthesizing a one-field video signal of $\underline{m}$-field ($\underline{m}$ is an integer of 2 or more) reproduction signals by interfield interpolation by using only a signal determined by the detector to have an amplitude exceeding a predetermined amplitude, wherein $\underline{n}$ is defined as follows:

$$n = (2l \cdot k \pm 1)/m$$

where $\underline{k}$ is an arbitrary integer.

The synthesizer comprises at least three field memories, and a control circuit for controlling the field memories such that a first one of the field memories is set in a first write mode for writing the reproduced signal, a second one of the field memories is set in a second write mode for writing, of the reproduced signals, the signal determined by the detector to have an amplitude exceeding the predetermined amplitude, and a third one of the field memories is set in a read mode for reading out the content therefrom, and that the modes of the memories are changed in an order of the first and second write modes and the read mode in units of fields of the reproduced signal.

BRIEF DESCRIPTION OF THE DRAWINGS

FIG. 5 is a detailed view showing contents of the reproduced signal shown in FIG. 4;

FIG. 6 is a view showing a rearrangement of the reproduced signals shown in FIG. 5 in an order of horizontal scanning line numbers;

FIG. 10 is a view showing a relationship between the C signals of the respective circuit components in FIG. 8;

FIGS. 12A to 12K are timing charts for explaining an operation of the apparatus shown in FIG. 11;

FIG. 13 is a view showing an arrangement rule of C signals in the odd and even fields of the TCI signal;

FIG. 14 is a block diagram showing an arrangement of a write address data correction circuit shown in FIG. 11;

FIGS. 15A to 15F are timing charts for explaining an operation of the correction circuit in FIG. 14;

FIG. 16 is a diagram showing an arrangement of a read address data correction circuit shown in FIG. 11;

FIGS. 17A to 17C are timing charts for explaining an operation of the correction circuit shown in FIG. 16;

FIG. 18 is a block diagram showing a main part of a video reproduction apparatus according to a third embodiment of the present invention;

FIG. 19 is a schematic plan view showing an arrangement of a tape drive system and a rotary head mechanism in the third embodiment;

FIGS. 20A to 20D are timing charts for explaining an operation of the apparatus shown in FIG. 18;

FIG. 24 is a view showing a relationship between the segments of the video signal and the positions on the reproduction screen in the third embodiment;

FIG. 25 is an illustrative view showing noise bars appearing on the reproduction screen in correspondence of the reproduction envelope of the two fields shown in FIG. 23;

DETAILED DESCRIPTION OF THE PREFERRED EMBODIMENTS

Figure 1:
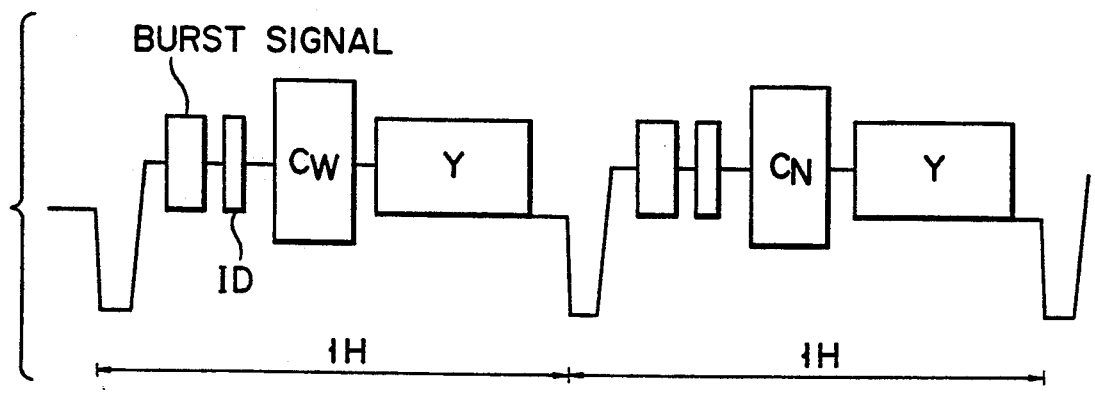
FIG. 1 is a view showing a TCI signal format.
Figure 2:
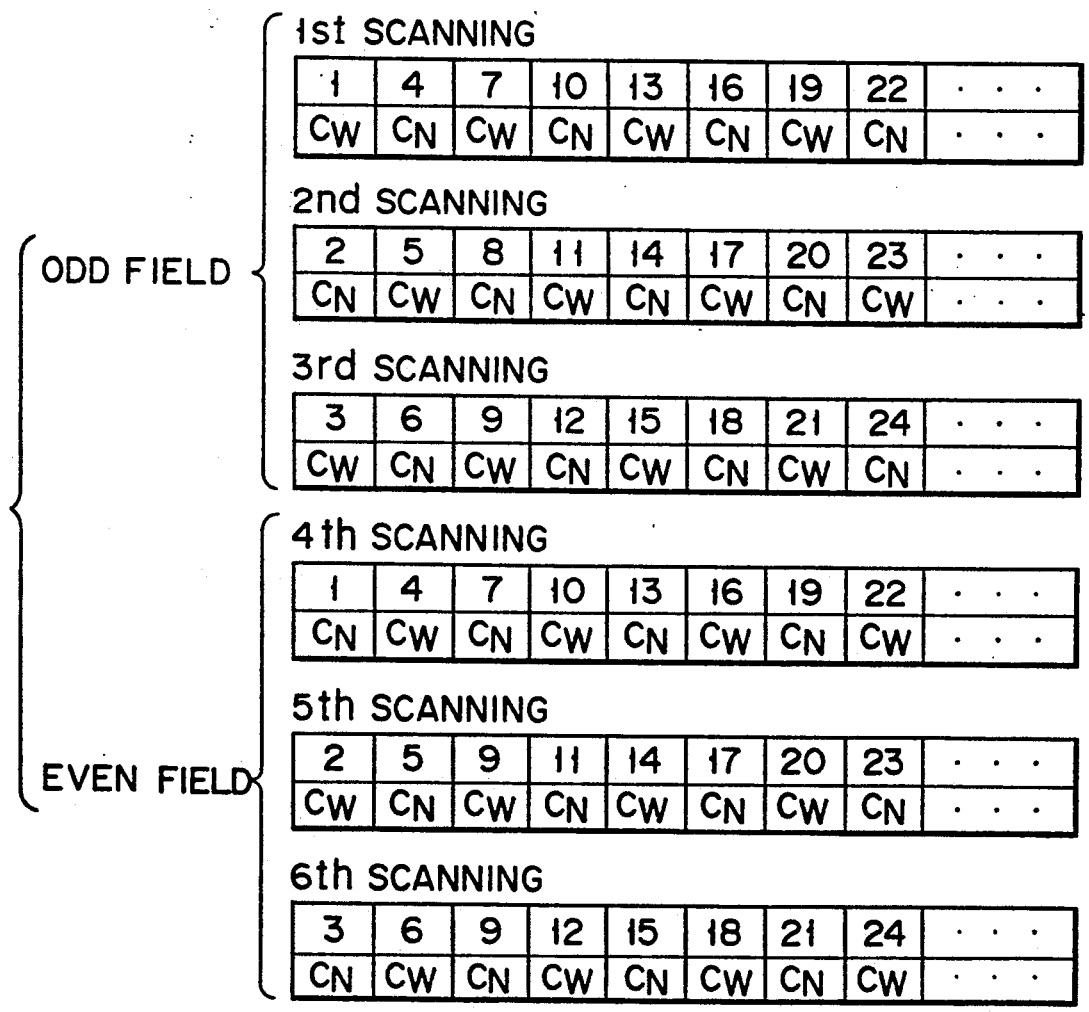
FIG. 2 is a view showing chrominance signal arrangement on the segments of odd and even fields when the TCI signal in FIG. 1 is segment-recorded.
Figure 3:
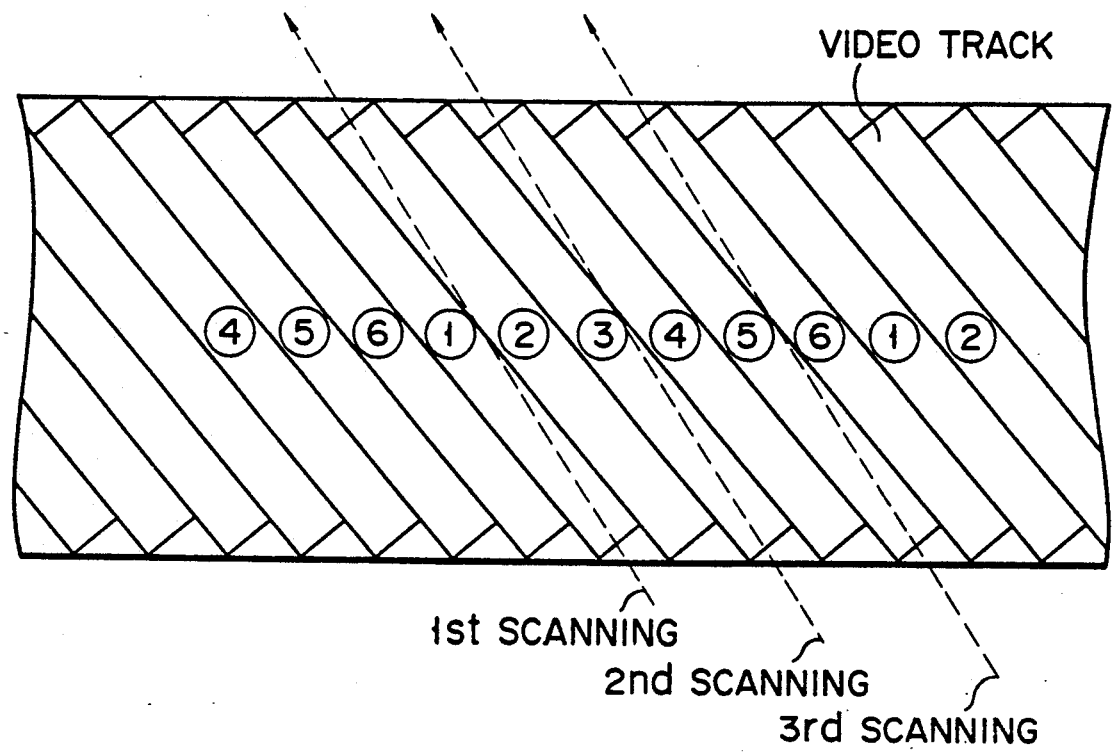
FIG. 3 is a view showing a head scan trace in double speed reproduction in a helical scan VTR of a segment recording scheme.
Figure 4:
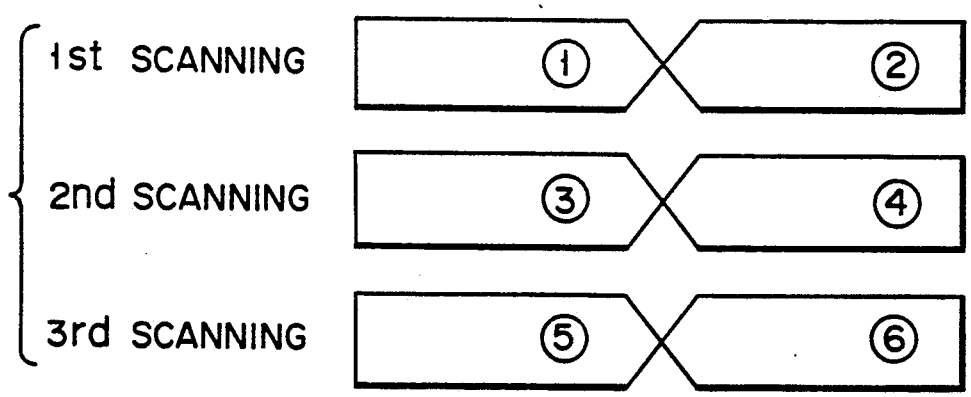
FIG. 4 is a view showing segments in the reproduced signal obtained by scanning shown in FIG. 3.
Figure 7:
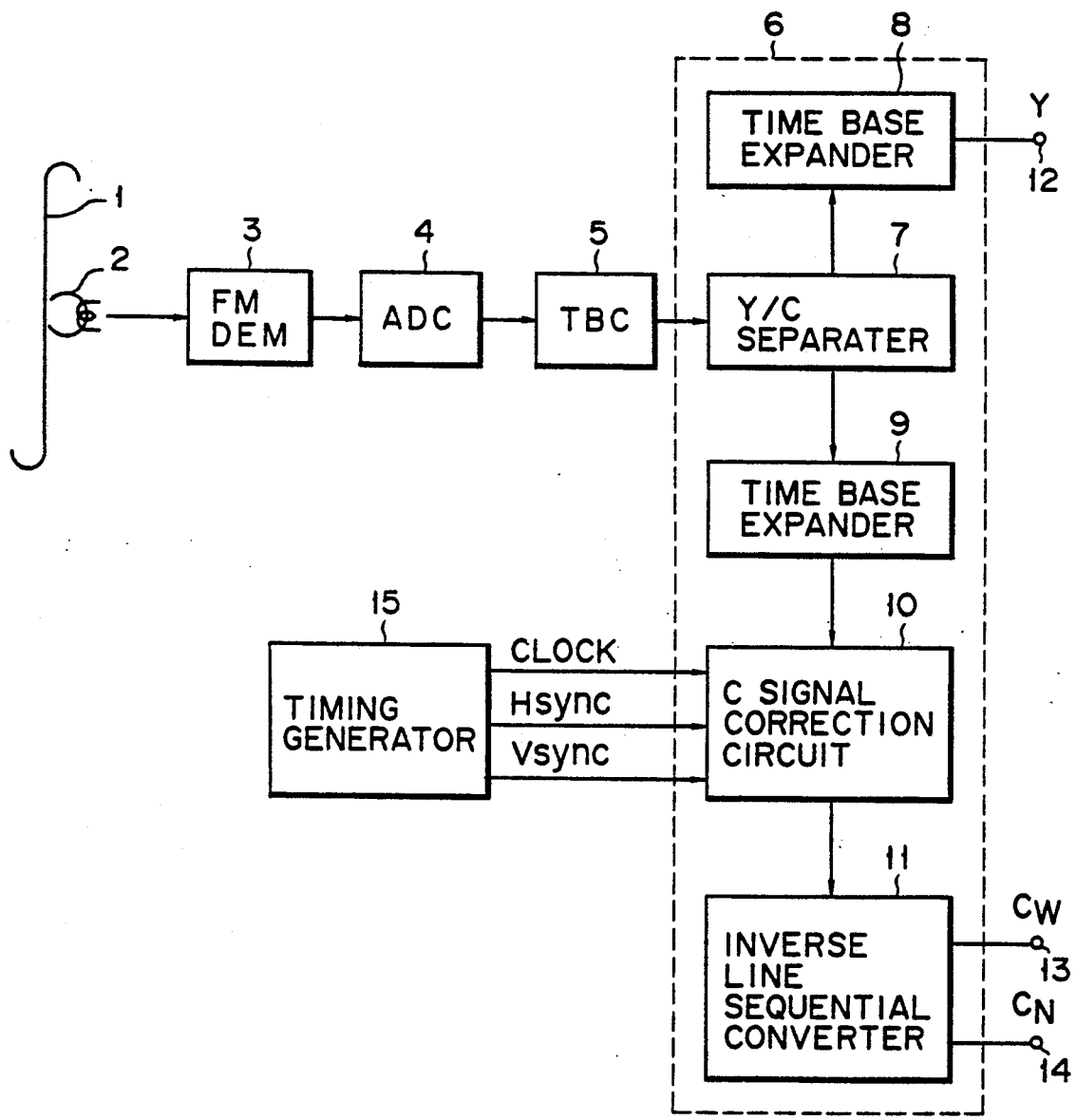
FIG. 7 is a schematic block diagram showing an arrangement of a video reproduction apparatus according to a first embodiment of the present invention.

FIG. 7 schematically shows an arrangement of a video reproduction apparatus according to the present invention. A color video signal is recorded as an FM-modulated wave in a magnetic tape 1 in accordance with a TCI signal format shown in FIG. 1. A magnetic head 2 is mounted in a rotary drum (not shown) and reproduces the FM-modulated wave recorded in the magnetic tape 1. An FM demodulator 3 demodulates a signal reproduced by the magnetic head 2 and outputs a baseband TCI signal. An A/D converter 4 converts the TCI signal into a digital signal in which one word corresponds to, e.g., eight bits. A TBC (time base corrector) 5 is arranged by using a digital memory and performs correction for eliminating a time base error of the digital TCI signal from the A/D converter 4.

A TCI signal output from the TBC 5 is input to a TCI decoder 6. The decoder 6 comprises a Y/C separator 7, time base expanders 8 and 9, a C signal correction circuit 10, and an inverse line sequential converter 11. The Y/C separator 7 separates the TCI signal from the TBC 5 into a Y signal and C signals (including color index signals). The time base expanders 8 and 9 expand the time-base compressed Y and C signals in the TCI signal along the time base. A Y signal output from the time base expander 8 is output to a terminal 12.

The C signal correction circuit 10 corrects the C signals from the time base expander 9 to obtain an accurate line sequential order. A timing circuit 15 outputs various timing signals required for correction operation of the C signal correction circuit 10. That is, the timing circuit 15 outputs a horizontal sync signal Hsync, a clock signal, and a vertical sync signal Vsync. The inverse line sequential converter 11 separates the line sequential C signals corrected by the C signal correction circuit 9 into $C_W$ and $C_N$ signals. The inverse line sequential converter 11 also performs vertical interpolation of the $C_W$ and $C_N$ signals, thereby restoring signal components which are lost by line sequential processing in the horizontal scanning period. The $C_W$ and $C_N$ signals from the inverse line sequential converter 11 are output to terminals 13 and 14, respectively.

Figure 8:
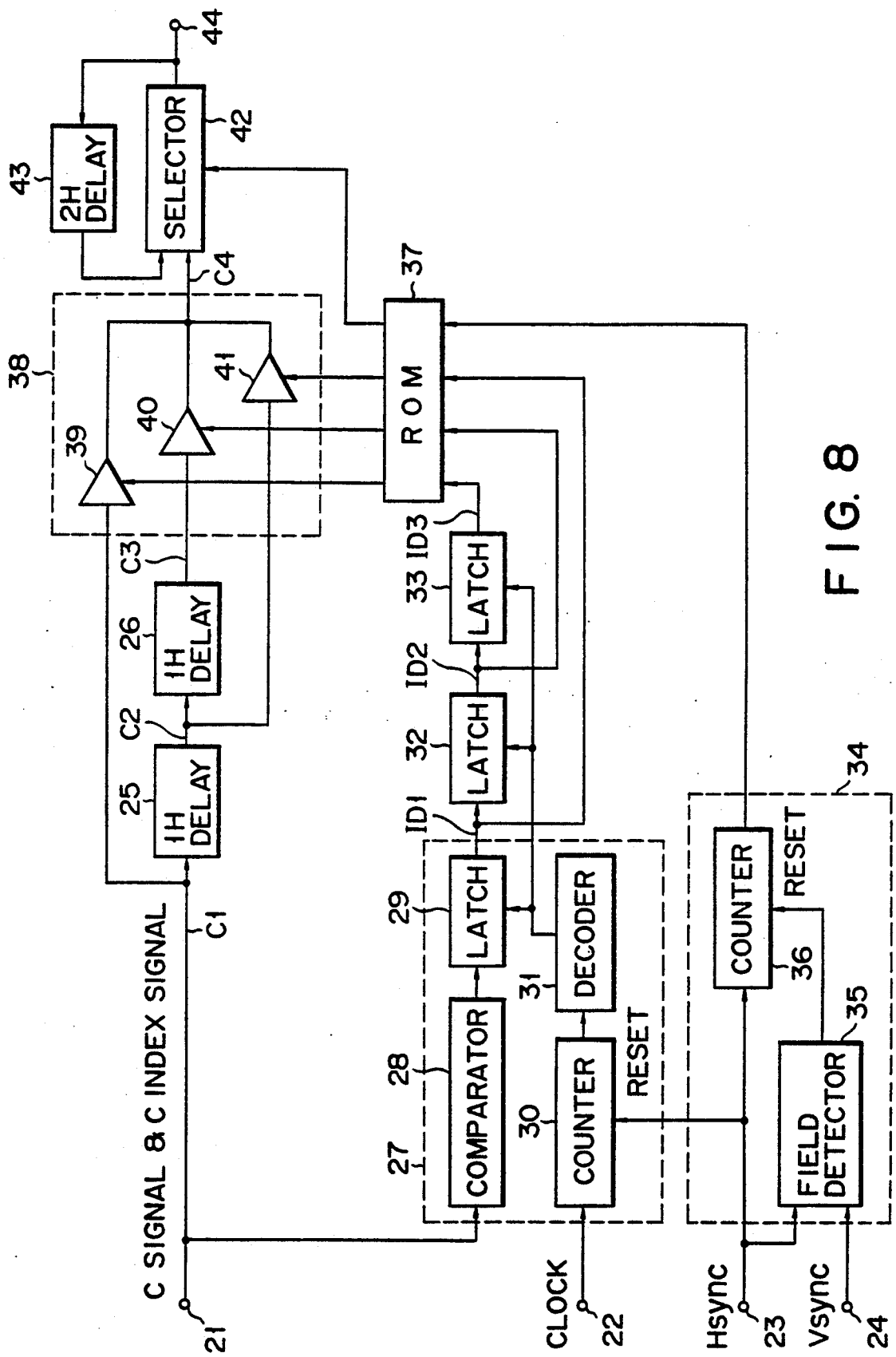
FIG. 8 is a block diagram showing an arrangement of a C signal correction circuit shown in FIG. 7.

As shown in FIG. 8, the C signal correction circuit 10 comprises two cascade-connected 1H delay circuits 25 and 26, a C index extraction circuit 27, two cascade-connected latches 32 and 33, a C signal identification circuit 34, a read-only memory 37, a first selector 38, a second selector 42, and a 2H delay circuit 43. FIGS. 9A to 9L are timing charts of signals generated by the circuit components of the arrangement shown in FIG. 8.

Figure 9:
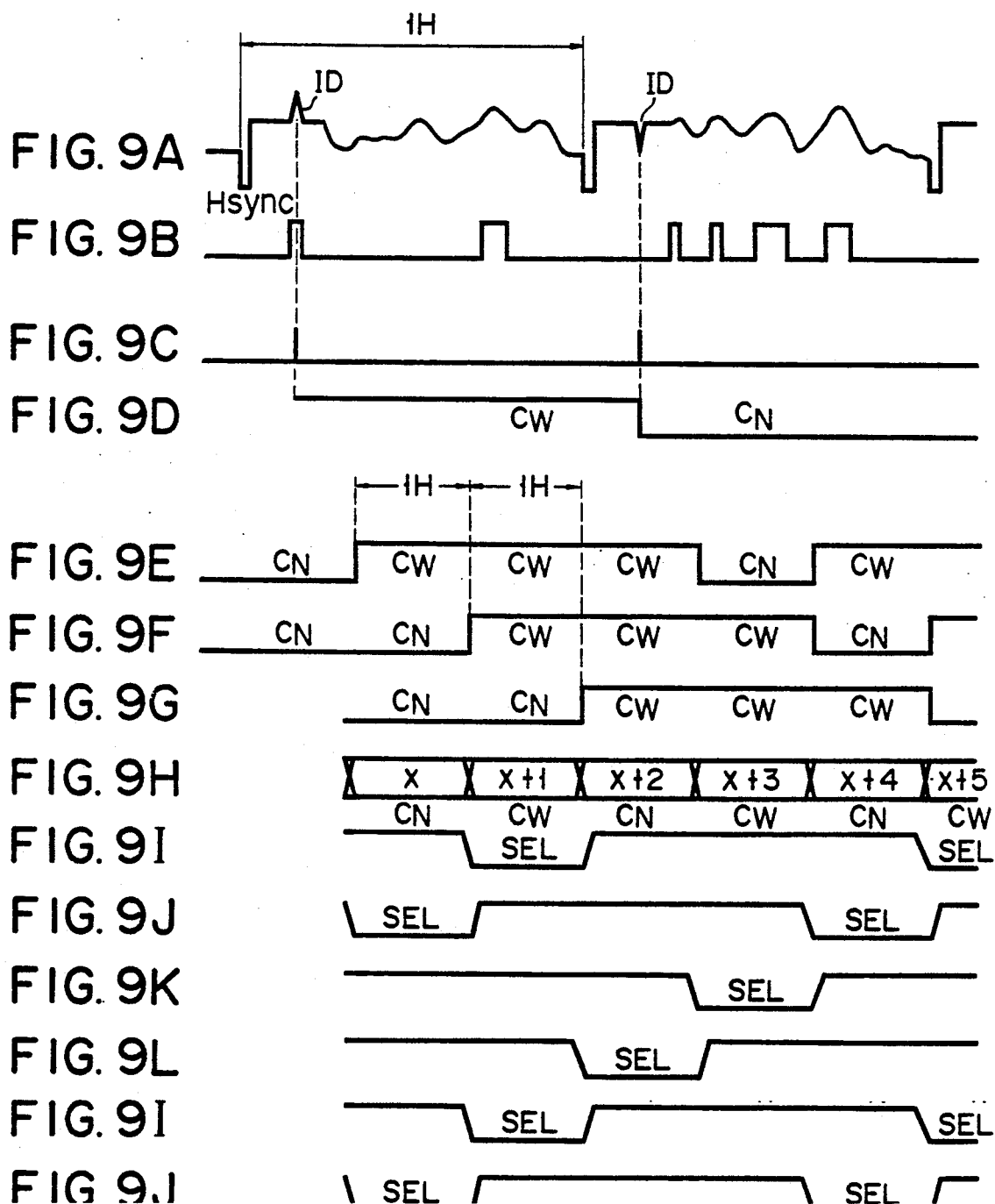
FIGS. 9A to 9L are timing charts for explaining an operation of the circuit shown in FIG. 8.

Referring to FIG. 8, the C signals and the C index signal shown in FIG. 9A are input from the time base expander 9 (FIG. 7) to a terminal 21. The 1H delay circuits 25 and 26 have a 1H (one horizontal scanning period) delay time of the input signal each. The signals input to the terminal 21 are also supplied to the C index extraction circuit 27. The C index extraction circuit 27 extracts a C index signal ID of the input signals. The C index extraction circuit 27 comprises a comparator 28, a latch 29, a counter 30, and a decoder 31. The comparator 28 compares the input signal with a predetermined level of the C index signal (e.g., the $C_W$ signal if the input signal level is higher than the predetermined level; and the $C_N$ signal if the input signal level is lower than the predetermined level). The comparator 28 outputs a binary signal (FIG. 9B) which is set at high level during a $C_W$ signal period and low level during a $C_N$ signal period. A clock signal from the timing generator 15 (FIG. 7) is supplied as a clock input to a terminal 22 of the counter 30. The horizontal sync signal Hsync from the timing generator 15 is supplied to a terminal 23 as a reset input. Therefore, the counter 30 generates a digital value corresponding to a position in a horizontal scanning period. The decoder 31 decodes an output value from the counter 30 and generates a timing pulse (FIG. 9C) at a timing of the C index signal. The latch 29 latches an output signal from the comparator 30 in response to this timing pulse, thereby generating an extracted C index signal (FIGS. 9D and 9E). FIG. 9E shows the extracted C index signal upon time-base compression of FIG. 9D.

The latches 32 and 33 perform latching in response to a timing pulse output from the decoder 31. That is, every time a new C index signal ID is extracted by the C index extraction circuit 27, the latch 32 holds this C index signal until the next C index signal is extracted. Similarly, the latch 33 holds the output from the latch 32 until the next C index signal is extracted. Output signals from the latches 32 and 33 are shown in FIGS. 9F and 9G, respectively.

The C signal identification circuit 34 identifies the type C of signal supposed to appear in each horizontal scanning period of the signal input to the terminal 21. The identification circuit 34 comprises a field detector 35 and a counter 36. The field detector 35 generates a field identification signal representing whether the signal input to the terminal represents an odd or even field by using the vertical and horizontal sync signals Vsync and Hsync supplied from the timing generator 15 to the terminal 23 and a terminal 24. The counter 36 receives the field identification signal as a reset input and generates an identification signal (FIG. 9H) in response to the horizontal sync signal Hsync as a clock input.

The ROM 37 receives a signal input to the C index extraction circuit 27, output signals from the latches 32 and 33, and an output signal from the C signal identification circuit 34 as address inputs and generates binary selection control signals (FIGS. 9I, 9J, and 9K) supplied to the selector 38 and a binary selection control signal (FIG. 9L) supplied to the selector 42. The selection control signals to be supplied to the selectors 38 and 42 are written in the ROM 37 in correspondence with the address inputs.

The signal input to the terminal 21, and output signals from the 1H delay circuits 25 and 26 are respectively input to three buffers 39, 40, and 41 constituting the selector 38. When selection control signals are set at high level, outputs from the buffers 39, 40, and 41 are set at a high impedance. However, when the selection control signals are set at low level, the buffers 39, 40, and 41 directly output the input signals (i.e., in the "SEL" states in FIGS. 9I, 9J, and 9K).

The selector 42 directly outputs the output signal from the selector 38 when the selection control signal supplied thereto is set at high level. However, when the selection control signal is set at low level, the selector 42 causes the 2H delay circuit 43 to delay the output signal from the selector 42 and outputs a 2H-delayed (two horizontal scanning periods) signal. An output signal from the selector 43 is output to the inverse line sequential converter 11 (FIG. 7) through a terminal 44.

An operation of the C signal correction circuit 10 will be described below. A C index signal (to be referred to as a C index signal ID1 hereinafter) representing the type of C signal (to be referred to as a C signal C1 hereinafter) included in the signal input to the input terminal 21 appears at the output of the C index extraction circuit 27. C index signals (to be referred to as C index signals ID2 and ID3 hereinafter) representing types of C signals appearing as the output signals from the 1H delay circuits 25 and 26 appear at the outputs of the latches 32 and 33. The C index signals ID1, ID2, and ID3 and an output (an output from the counter 36) in the C index identification circuit 34 are supplied to the ROM 37 as address inputs. A maximum number of combinations of the C index signals ID1, ID2, and ID3 is $2^3 = 8$. Since the $C_W$ or $C_N$ signal is output at the terminal 44 by an output value (i.e., a horizontal scanning line number) of the counter 36 on the basis of one of the combinations of the C index signals ID1, ID2, and ID3, a maximum number of combinations of the signals ID1, ID2, and ID3, and the C signal (to be referred to as a signal Cout hereinafter) to be output from the terminal 44 is 16. FIGS. 10 shows 16 combinations of the signals C1, C2, C3, and Cout, and corresponding output signals (referred to as signals C4 hereinafter) from the selector 38. As is apparent from FIG. 10, the numbers of signals selected by the selector 38 from the C signals C1, C2, and C3 as the input signals in correspondence with the combinations of the C signals C1, C2, C3, and Cout are 0 to 3. The selector 38 selects the C signal C1, C2, or C3 in accordance with the selected number, i.e., 1, 2, or 3. The C signal selected by the selector 38 is directly output to the terminal 44 through the selector 42.

The number of signals selected by the selector 38 from the C signals C1, C2, and C3 is 2 or 3, the selector 38 may select any one of the signals C1, C2, and C3 in order to establish the line sequential relationship between the C signals output from the terminal 44. In order to obtain good image quality, it is preferable to select a C signal in a horizontal scanning period close to the corresponding horizontal scanning line. The horizontal scanning line number corresponding to the C signal to be currently output from the terminal 44 and the horizontal scanning line numbers respectively corresponding to the C signals C1, C2, and C3 are calculated by an output value from the counter 36 in the C signal identification circuit 34. The contents of the ROM 37 are determined on the basis of the calculation results. Therefore, of the C signals C1, C2, and C3, the selector 38 can select a C signal corresponding to the horizontal scanning line number having the smallest difference from the horizontal scanning line number corresponding to the C signal Cout to be output from the terminal 44.

When the number of signals selected by the selector 38 from the C signals C1, C2, and C3 is zero, i.e., when the type of the C signal Cout supposed to be output from the terminal 44 does not correspond to any one of the C signals C1, C2, and C3, a selection control signal supplied from the ROM 37 to the selector 42 goes low. Therefore, an output signal from the 2H delay circuit 43 is selected by the selector 42. The output signal from the 2H delay circuit 43 is the same type as that of the C signal to be currently output from the terminal 44 and is 2H ahead thereof. The C signals complying with the line sequential scheme appear at the terminal 44. The C signal at the terminal 44 is supplied to the inverse line sequential converter 11 shown in FIG. 11.

According to the first embodiment, in the VTR for recording a color video signal by a TCI signal format, the line sequential order of the chrominance signals which is lost upon setting of a special reproduction mode can be restored to obtain a color reproduced image in the special reproduction mode.

Figure 11:
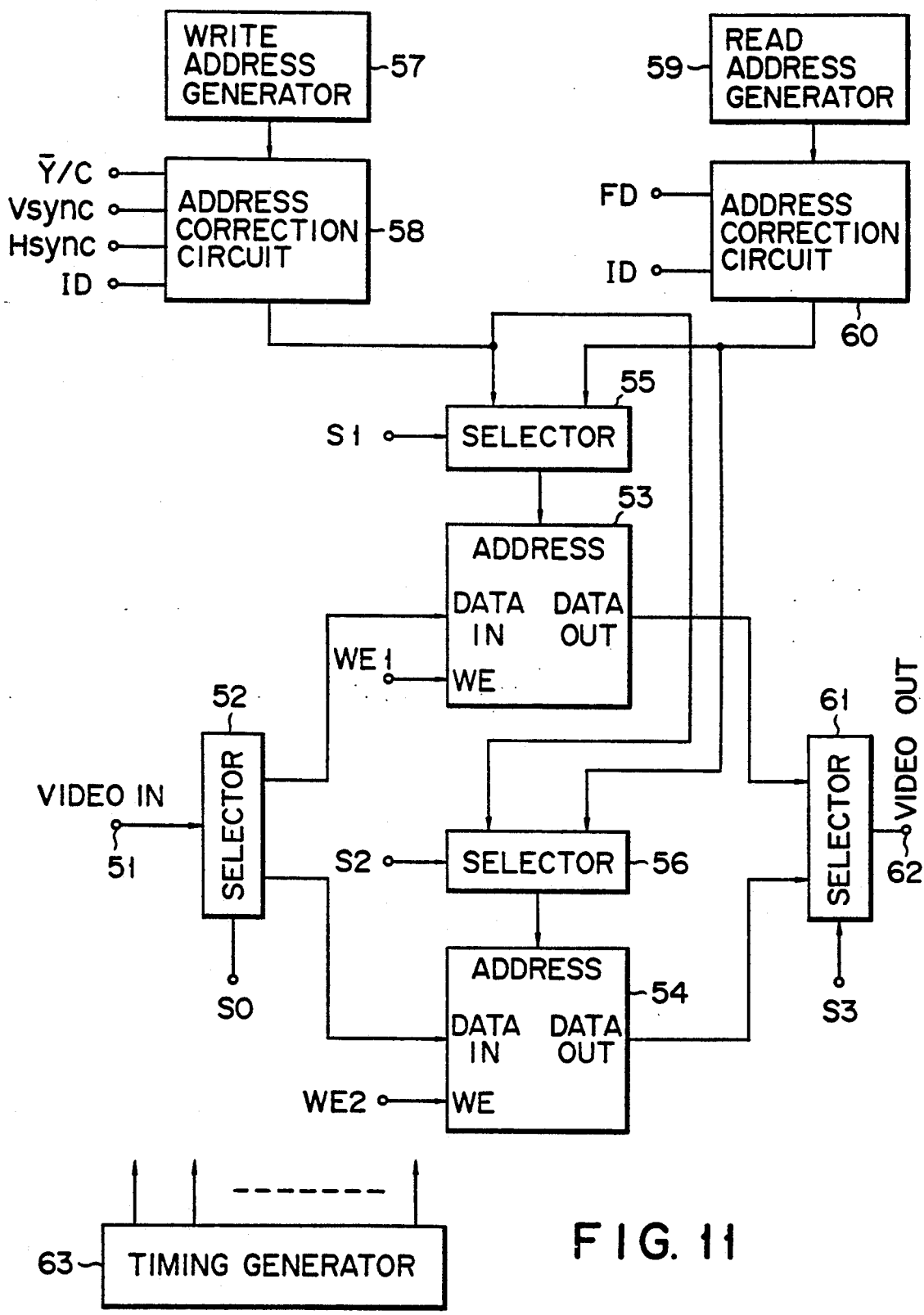
FIG. 11 is a block diagram showing a main part of a video reproduction apparatus according to a second embodiment of the present invention.

A second embodiment is shown in FIG. 11. In this embodiment, the TBC 5 shown in FIG. 7 has a C signal correction function. In the second embodiment, the C signal correction circuit 10 in FIG. 7 is omitted. A TBC shown in FIG. 11 comprises selectors 52, 55, 56, and 61, field memories 53 and 54, a write address generator 57, a read address generator 59, address correction circuits 58 and 60, and a timing generator 63. The selectors 52, 55, 56, and 61 are switched in response to selection control signals S0, S1, S2, and S3 output from the timing generator 63.

FIGS. 12A to 12K are timing charts of signals generated by the components of the arrangement shown in FIG. 11. The timing generator 63 incorporates a signal source for generating a reference field signal having a one-field period shown in FIG. 12A. Various signals shown in FIGS. 12B, 12C, 12D, 12F, 12H, and 12I are generated on the basis of this reference field signal.

Referring to FIG. 11, a digital TCI signal from the A/D converter 4 (FIG. 7) is input to a terminal 61. This TCI signal includes $C_W$ and $C_N$ signals, the order of which is opposite in odd and even fields. The TCI signal is input to the field memories 53 and 54 through the selector 52. The field memories 53 and 54 are alternatively set in the write and read modes every field of the TCI signal by mode switching signals (FIGS. 12B and 12C) from the timing generator 63. Referring to FIGS. 12B and 12C, reference symbol W denotes a write mode; and R, a read mode. The selector 52 performs switching every one-field period in response to the selection control signal S0 shown in FIG. 12H to supply the TCI signal to one of the field memories 53 and 54 which is set in the write mode. The selector 61 performs switching every one-field period in response to the selection control signal S3 (FIG. 12I) to supply to the terminal 62 the TCI signal from one of the field memories which is set in the read mode.

The selectors 55 and 56 are switched every field period in response to the corresponding selection control signals S1 and S2 (FIGS. 12D and 12F). Address data generated by the write address generator 57 are alternately supplied to the address inputs of the field memories 53 and 54 every field through the address correction circuit 58 and the corresponding selectors 55 and 56. Similarly, address data generated by the read address generator 59 are alternatively supplied every field to the address inputs of the field memories 53 and 54 through the address correction circuit 60 and the corresponding selectors 55 and 56. FIGS. 12E and 12G show contents of the address data supplied to the field memories 53 and 54, respectively. Reference symbol WA denotes write address data; RA, read address data.

The address correction circuits 58 and 60 correct the address data generated by the write and read address generators 57 and 58 in the C signal write and read modes, respectively, in order to assure the line sequential order of the C signals in the TCI signal output from the terminal 52. A detailed arrangement of the address correction circuit 58 is shown in FIG. 14, and timing charts of the arrangement in FIG. 14 are shown in FIG. 15A to 15F.

Referring to FIG. 14, an identification signal $\overline{Y}/C$ (FIG. 15D) representing whether the TCI signal (FIG. 15A) input to the terminal 51 shown in FIG. 11 represents a Y or C signal period is input to a terminal 71. A horizontal sync signal Hsync is input to a terminal 72. A C index signal ID (FIG. 15C) representing whether the C signal is a $C_W$ or $C_N$ signal is input to a terminal 73. Write address data from the write address generator 58 in FIG. 11 is input to a terminal 74. The identification signal $\overline{Y}/C$, the horizontal sync signal Hsync, and the C index signal ID are generator by the timing generator 63 shown in FIG. 11.

A $\frac{1}{2}$ frequency divider 76 is preset by the vertical sync signal Vsync and frequency-divides the horizontal sync signal Hsync to generate the identification signal (FIG. 15B) representing the type of C signal supposed to appear in each horizontal scanning period of the TCI field in an odd field (or even field). For example, if a horizontal scanning period corresponding to the horizontal sync signal Hsync corresponds to the $\alpha$th line, the C signal in the odd field corresponding to this line is the $C_W$ signal as shown in FIG. 13. In the $(\alpha+1)$th line of the horizontal scanning period corresponding to the horizontal sync signal Hsync, the C signal of the even field corresponding to this line is the $C_N$ signal. An output signal from the frequency divider 76 is set at high level during the $C_W$ signal period and low level during the $C_N$ signal period. The C index signal ID shown in FIG. 15C is extracted by the same arrangement as the C index extraction circuit 27 (FIG. 8). In this embodiment, the C index signal ID is set at high level during the $C_W$ signal period and low level during the $C_N$ signal period.

An exclusive OR (EOR) gate 77 compares an output signal from the $\frac{1}{2}$ frequency divider 76 with the C index signal ID to determine whether these signals coincide with each other. If a coincidence is established, i.e., when the reproduced signal line (i.e., the horizontal scanning line of the TCI signal input to the terminal 51) represents an odd field and the C index signal ID represents the C signal order in the odd field, the EOR gate 77 outputs a signal of low level. Otherwise, the EOR gate 77 outputs a signal of high level. An output signal from the EOR gate 77 is shown in FIG. 15E. When the output signal from the EOR gate 77 is set at high level and the identification signal $\overline{Y}/C$ is set at high level (i.e., the C signal period of the TCI signal), an AND gate 78 outputs a signal of high level. Otherwise, the AND gate 78 outputs a signal of low level. The output signal from the AND gate 78 is shown in FIG. 15F.

An adder 80 adds the write address data input to a terminal 75 and a "−1" preset value to generate corrected write address data. Noncorrected and corrected write address data are supplied to buffers 81 and 82, respectively. The output signal from the AND gate 78 is supplied to the buffer 81 as an output control signal. A signal obtained by inverting the output signal from the AND gate 78 by an inverter 79 is supplied to the buffer 82 as an output control signal. The output control signals supplied to the buffers 81 and 82 are set at low level, the buffers 81 and 82 directly output the input signals. Otherwise, the outputs from the buffers 81 and 82 are set at a high impedance.

When the type of C signal (FIG. 15B) identified by the output signal from the $\frac{1}{2}$ frequency divider 76 does not coincide with the type of C signal (FIG. 15C) designated by the C index signal ID, i.e., when the TCI signal represents an even field, the output signal from the AND gate 78 is set at high level (FIG. 15F) during the C signal period of the TCI signal shown in FIG. 15A. Therefore, the output from the buffer 81 is set at a high impedance, and the buffer 82 is set to be a "through" state. The data corrected by advancing the write address data input to the terminal 75 by a 1H output to a terminal 83. When the TCI signal is determined to represent the odd filed and the period is determined to be the Y signal period of the TCI signal, the buffer 81 is set in a "through" state. In this case, the output from the buffer 82 is set to be a high-impedance output. Therefore, the write address data input to the terminal 75 is directly output to the terminal 83.

Referring to FIG. 11, the TCI signal input to the terminal 51 is written in memory areas in the field memories 53 and 54 at addresses designated by the write address data input through the address correction circuit 58 shown in FIG. 14. For this reason, the odd- and even-field C signals stored in the field memories 53 and 54 are stored in an odd-field arrangement. That is, the odd-field C signals shown in FIG. 13 are originally supposed to be arranged as the $C_W$ signals for the $\alpha$th lines and the $C_N$ signals for the $(\alpha+1)$th lines, while the even-field C signals are originally supposed to be arranged as the $C_N$ signals for the $\alpha$th lines and the $C_W$ signals for the $(\alpha+1)$th lines. However, in a state wherein the C signals are stored in the field memories 53 and 54, the original arrangement of the C signals in the odd fields is given such that the $C_W$ signals are arranged for the same $\alpha$th lines as those of the odd field, and the $C_N$ signals are arranged for the same $(\alpha+1)$th lines as those of the odd field. Therefore, the $C_W$ and $C_N$ signals are alternately arranged every horizontal scanning period in the odd and even fields in the field memories 53 and 54, thereby maintaining the line sequential order in the field.

When the contents of the field memories 53 and 54 are directly read out, the correct line sequential order of the C signals between the odd and even fields cannot be obtained. As described above, the C signals $C_W$ and $C_N$ in the even field are reversed and are arranged in the same manner as in the odd field. However, the line sequential order of the C signals between the fields can be restored since the read address data from the read address generator 59 is corrected by the address correction circuit 60 in FIG. 11. A detailed arrangement of the address correction circuit 60 is shown in FIG. 16, and the timing charts of the signals in FIGS. 15A to 15F are shown in FIGS. 17A to 17C.

A field identification signal FD (FIG. 17A) which represents whether the TCI signal read out from the field memories 53 and 54 represents an odd or even field is input to a terminal 91. An identification signal $\overline{Y}/C$ representing whether the TCI signal represents the Y or C signal period is input to a terminal 92. Read address data from the read address generator 59 in FIG. 11 is input to a terminal 93. The field identification signal FD and the identification signal $\overline{Y}/C$ are generated by the timing generator 63 shown in FIG. 11.

An AND gate 94 outputs a signal of high level when the field identification signal FD is set at high level and the identification signal $\overline{Y}/C$ is set at high level, i.e., when the the C signals of the TCI signal in the even field are read out from the field memories 53 and 54. Otherwise, the AND gate 94 outputs a signal of low level. The output signal from the AND gate 94 is shown in FIG. 17C.

An adder 96 adds the read address data input to the terminal 93 and a "−1" preset value to generate corrected read address data. The noncorrected and corrected read address data are inputs to buffers 97 and 98, respectively. The output signal from the AND gate 94 is supplied to the buffer 97 as an output control signal. A signal obtained by inverting the output signal from the AND gate 94 by an inverter 95 is supplied to the buffer 98 as an output control signal. When the output control signals supplied to the buffers 97 and 98 are set at low level, the buffers 97 and 98 directly output the input signals. Otherwise, outputs from the buffers 97 and 98 are set at a high impedance.

When the C signals of the TCI signal of the even field are read out from the field memories 53 and 54, the output signal from the AND gate 94 is set at high level, as shown in FIG. 17C. An output from the buffer 97 is set at a high impedance, and the buffer 96 is set in a "through" state. The data corrected by advancing the read address data input to the terminal 93 by one horizontal scanning period is output to a terminal 90.

When the TCI signal of the odd field is read out from the field memories 53 and 54 and the Y signal of the TCI signal of the even field is read out, the buffer 97 is set in a "through" state and an output from the buffer 98 is set at a high impedance. Therefore, the read address data input to the terminal 93 is output to a terminal 99.

Referring to FIG. 11, the contents of the field memories 53 and 54 are read out from the memory areas at addresses designated by the read address data input through the address correction circuit 60 shown in FIG. 15. For this reason, the C signals of the even field which are arranged in the same manner as the C signals of the odd field in the field memories 53 and 54 are arranged as $C_N$ signals for the $a$th lines and $C_W$ signals for the $(a+1)$th lines, in the same manner of the original C signal of the even field. Therefore, the line sequential order of the C signals between the fields can be restored.

In the second embodiment, the two field memories are used as a storage means. However, only one field memory may be used to equally correct the C signals. In addition, in the second embodiment, the address correction circuits 58 and 60 shift the write and read addresses for the even-field C signals by one horizontal scanning period each. However, the write and read address signals for the odd-field C signals may be shifted by one horizontal scanning period each. Furthermore, the shift amount of the write and read address signals need not be one horizontal scanning period. A shift amount may be an odd multiple of one horizontal scanning period. The present invention is also applicable to a case wherein identical C signal format recorded continuously within two successive horizontal scanning periods such as $C_W$, $C_W$, $C_N$, $C_N$, $C_W$, $C_W$, $C_N$, $C_N$ . . . In this case, shift amounts of the write and read addresses are set to be an even multiple of horizontal scanning period.

According to the second embodiment, the line sequential order of the chrominance signals which is lost by special reproduction in the VTR can be restored, and a color reproduced image by special reproduction can be obtained.

FIG. 18 is a block diagram showing a main arrangement of a video reproduction apparatus according to a third embodiment of the present invention. This video reproduction apparatus comprises an FM demodulator (FM DEM) 102, an A/D converter (ADC) 103, a level detector 104, a selector 110, first, second, and third field memories 121, 122, and 123, a selector 130, a reference signal generator 141, a counter 142, and a decoder 143.

FM video signals which are alternately reproduced from a magnetic tape 20 by rotary heads 205 and 206, as shown in FIG. 19, are input to a terminal 101 in FIG. 18. The rotary heads 205 and 206 are mounted on a head drum 24 arranged in a travel path of the magnetic tape 203 from a supply reel 201 to a take-up reel 202. The MF demodulator 102 demodulates a reproduced signal of the FM modulation wave input to the terminal 101 and outputs a base-band video signal. The A/D converter 103 converts this video signal into a digital signal. The level detector 104 detects a level (i.e., an envelope amplitude) of the reproduced video signal and determines whether the video signal can be accurately reproduced. If the amplitude of the video signal exceeds a predetermined value, the level detector 104 outputs a signal of high level. Otherwise, the level detector 104 outputs a signal of low level. An output signal from the level detector 104 is supplied to write enable terminals of the field memories 121, 122, and 123.

The reference signal generator 141 generates a reference signal (FIG. 20A) having a one-field period. The counter 142 counts pulses of the reference signal. The decoder 143 decodes an output signal from the counter 142 to output field control signals 151, 152, and 153 (FIGS. 20B, 20C, and 20D) whose phases are offset by one field each.

The selector 110 distributes the reproduced digital video signals output from the A/D converter 103 to the field memories 121, 122, and 123. Three buffers 111, 112, and 113 constituting the selector 110 receive the control signals 151, 152, and 153 from the decoder 143. When the output control signals are set at low level, the buffers 111, 112, and 113 are set at a high impedance. Otherwise, the buffers 111, 112, and 113 directly output the input signals.

The control signal 151 is supplied to the first mode selection terminal of the field memory 121 and the second mode selection terminal of the field memory 123. The control signal 152 is supplied to the first mode selection terminal of the field memory 122 and the second mode selection terminal of the field memory 121. The control signal 153 is supplied to the first mode selection terminal of the field memory 123 and the second mode selection terminal of the field memory 121. Referring to FIGS. 20B, 20C, and 20D which respectively show the control signals 151, 152, and 153, reference symbol W denotes a write mode designation period; and R, a read mode designation period.

When the control signals of high level are supplied to the first mode selection terminals of the field memories 121, 122, and 123, and the control signals of low level are supplied to the second mode selection terminals thereof, the field memories 121, 122, and 123 are set in the first write mode in which all the reproduced one-field video signals are written. When the control signals of high level are supplied to both the first and second mode selection terminals of the field memories 121, 122, and 123, they are set in the second write mode in which the reproduced video signals are written while a signal of low level is supplied from the level detector 104 to the write enable terminal, i.e., when the write enable signal is not supplied. When the control signals of low level are supplied to the first mode selection terminals of the field memories 121, 122, and 123 and the control signals of high level are supplied to the second mode selection terminals thereof, the field memories 121, 122, and 123 are set in the read mode.

The selector 130 selects only one of the field memories 121, 122, and 123 which is set in the read mode and outputs the selected output to a terminal 134. Three buffers 131, 132, and 133 constituting the selector 130 receive the control signals 151, 152, and 153 as output control signals. The buffers 131, 132, and 133 are set at a high impedance when the output control signals are set at high level. Otherwise, the buffers 131, 132, and 133 directly output the input signals.

Figure 21:
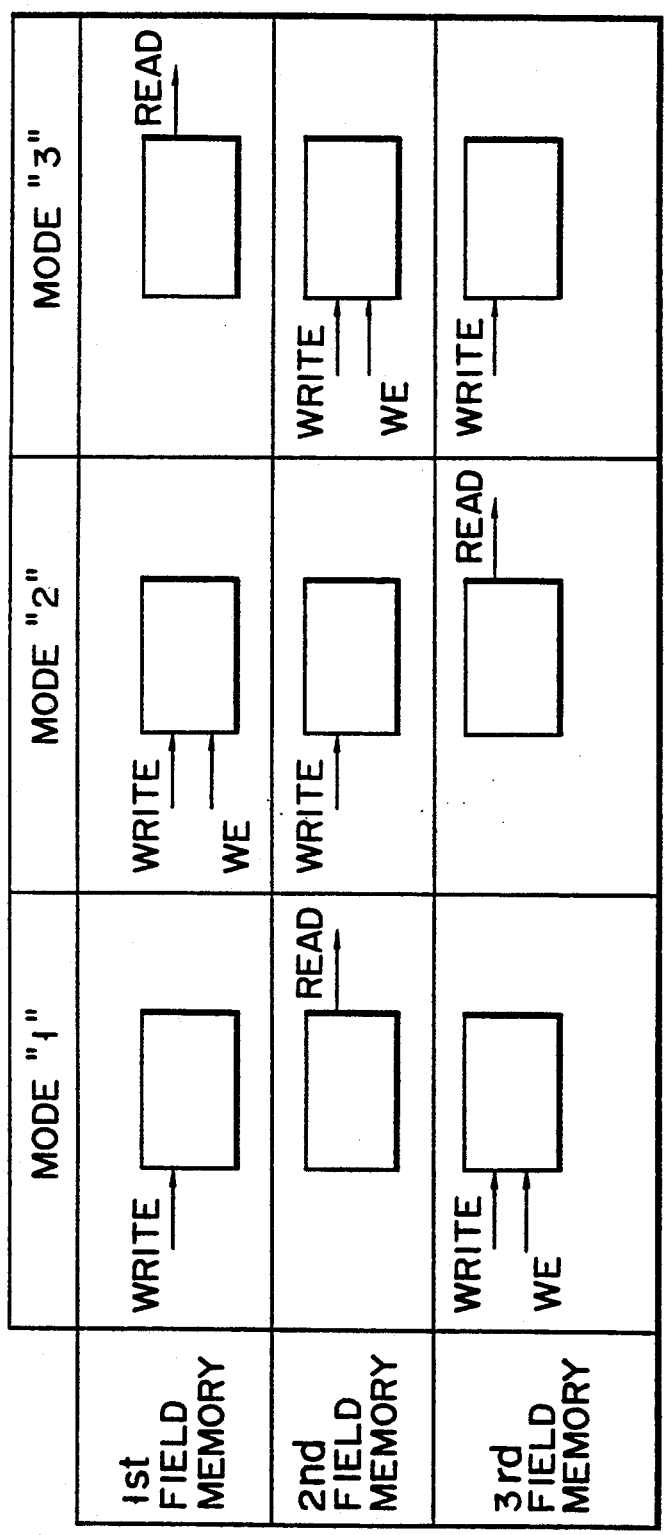
FIG. 21 is a view showing transition of operating states of the field memories in FIG. 18.

FIG. 21 illustrates changes in operating states of the field memories 121, 122, and 123 in accordance with the changes in control signals 151, 152, and 153 from the decoder 143 and changes in output signal from the level detector 104. Modes 1, 2, and 3 are cyclically changed every field of the reproduced video signals. Assume the mode changes of the first field memory 121. In mode "1", the field memory 121 is set in the write mode, and all reproduced video signals of the ith (i=1, 2, ...) field are written in the field memory 121. In the next mode "2", the field memory 121 is set in the write mode. Of all the reproduced video signals of the (i+1)th field, signals which are detected by the level detector 104 to have amplitudes exceeding the predetermined amplitude are written in the field memory 121. That is, in the second write mode, the reproduced video signals which are determined by the level detector 104 to have amplitudes which are lower than the predetermined amplitude are not written in the field memory 121 since a write enable signal WE from the level detector 104 is generated. In the next mode "3", the field memory 121 is set in the read mode simultaneously when the reproduced video signal of the (i+2)th field is input. The written contents are read out. The readout signals from the field memory 121 are output to the terminal 134 through the buffer 132 in the selector 130. In this manner, of the reproduced video signals of the two successive fields, i.e., the ith and (i+1) fields, signals having amplitudes exceeding the predetermined amplitude and free from noise bars are synthesized as a one-field video signal by interfield interpolation in the field memory 121. Write access of other field memories 122 and 123 by the first or second write mode is performed in mode "1", "2" or "3" so as not to set the field memories in the same mode, and read access thereof is performed in any other mode of modes "1", "2", and "3", as shown in FIG. 21.

Assume that one-field signals are segment-recorded in l tracks in the tape 203 shown in FIG. 19. In the special reproduction mode, the video signal recorded in the tape 203 is reproduced at a tape travel speed $\underline{n}$ times ($\underline{n}$ is $|n|>1$) the recording tape speed. In this case, in the apparatus shown in FIG. 18, if a one-field video signal is obtained by interfield interpolation using components having amplitudes exceeding the predetermined amplitude in the m-field ($\underline{m}$ is an integer of 2 or more) reproduced video signal components, $\underline{n}$ is selected to satisfy the following equation:

$$n = (2l \cdot k \pm 1)/m \tag{1}$$

where $\underline{k}$ is any positive integer.

When the above equation is satisfied, the components of the reproduced video signals of the respective fields which have amplitudes exceeding the predetermined amplitude complementarily appear in the fields. Therefore, a good image which is substantially free from a noise bar can be obtained.

Figure 22:
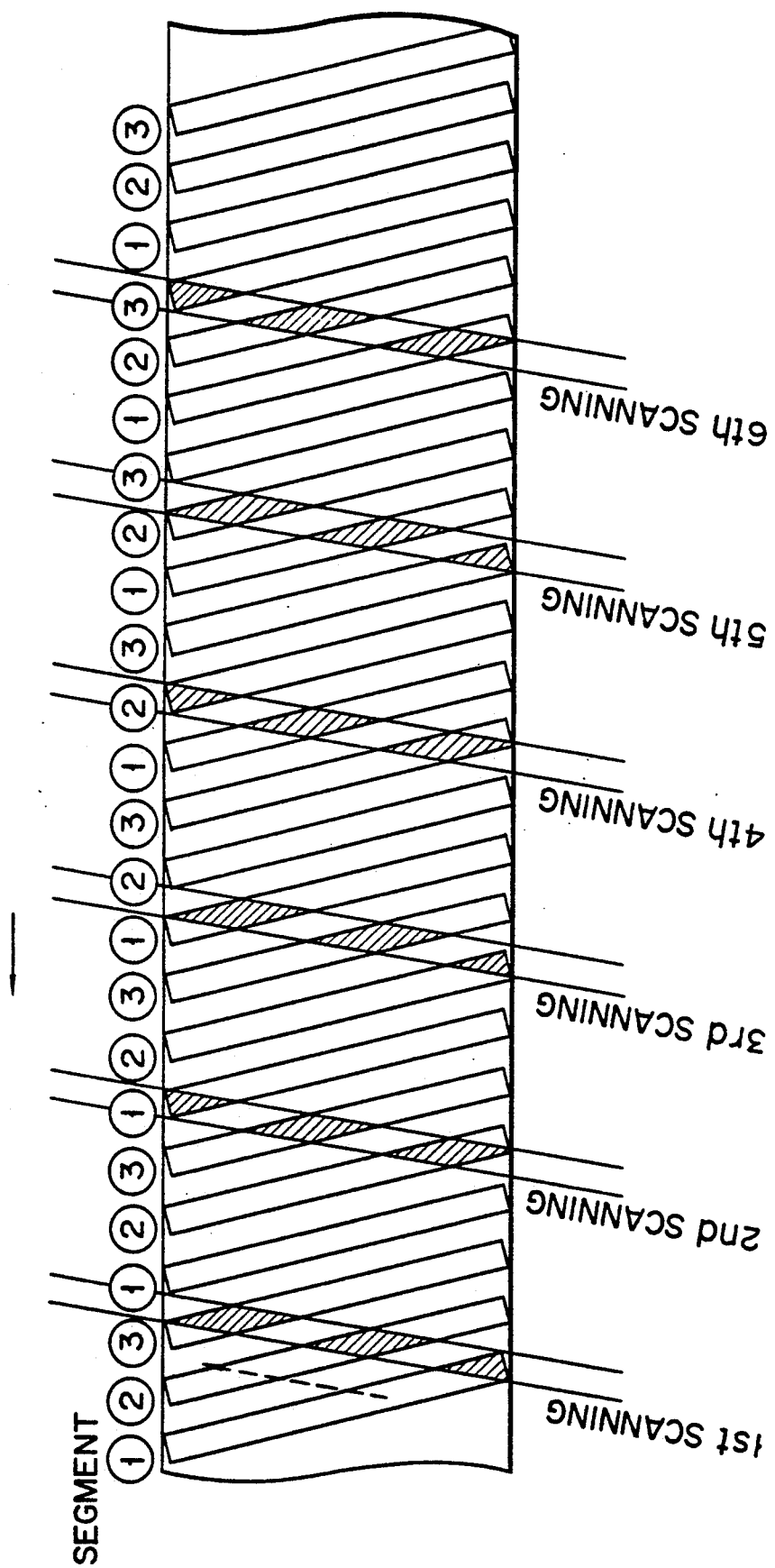
FIG. 22 is a view showing a scan trace of the rotary head on the tape in a special reproduction mode in which the tape speed is 7/2 times the normal speed in the third embodiment.
Figure 23:
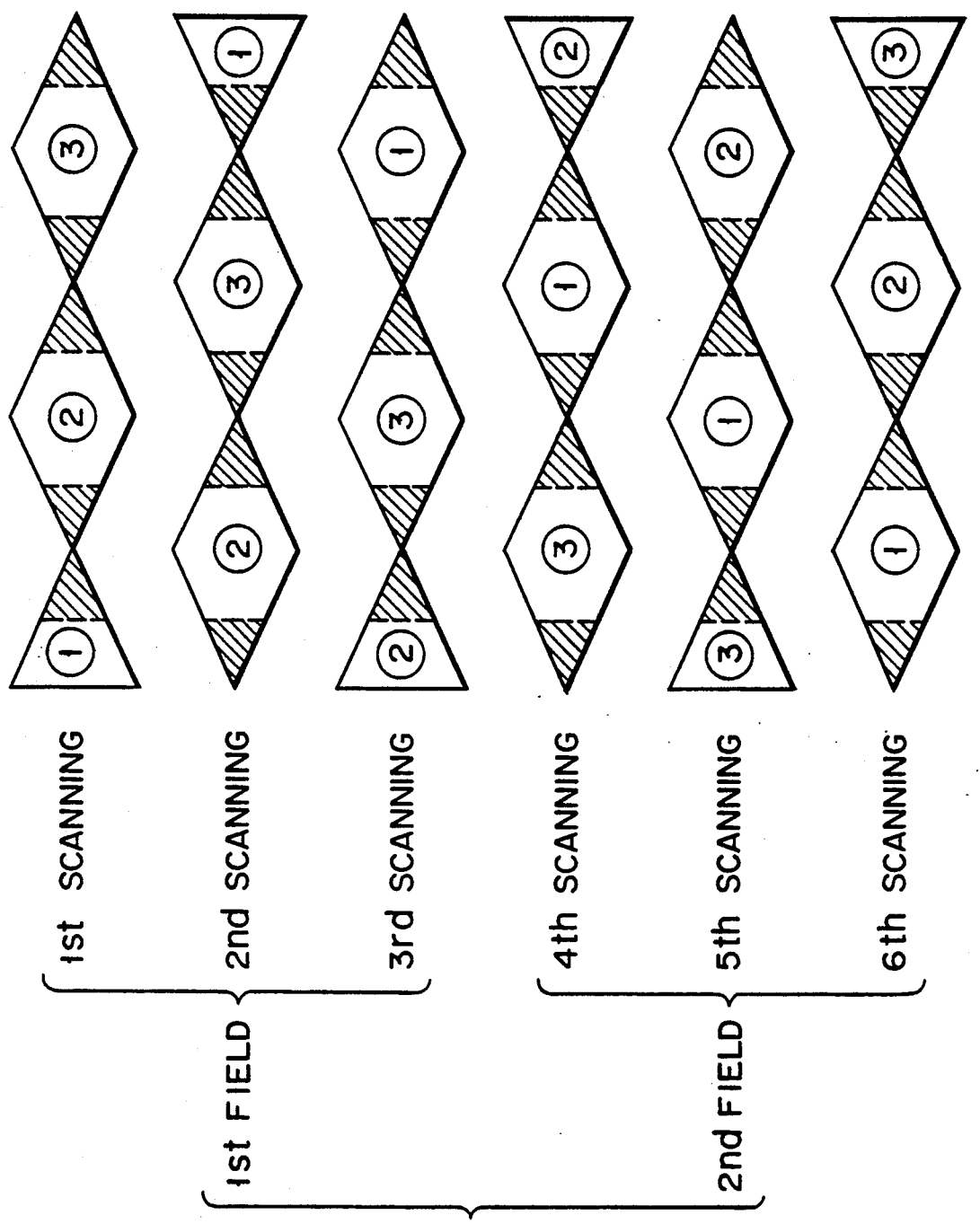
FIG. 23 is a view showing a reproduction envelope of two successive fields in the special reproduction mode.

FIG. 22 shows a trace of a rotary head which performs reproduction at a tape travel speed 7/2 times the normal recording speed of the tape 203 under the conditions that l=3, m=2, and k=1 in equation (1). Referring to FIG. 22, a solid arrow indicates a tape travel direction, and a broken arrow indicates a rotational direction of the rotary head. In this case, the reproduction envelope (i.e., an envelope of the reproduced video signal) is shown in FIG. 23. Referring to FIG. 23, hatched portions represent portions in which the amplitudes of the reproduced video signals are smaller than the predetermined amplitude, that is, the hatched portions represent noise-bar portions. When the segments of the reproduced video signal correspond to positions on the screen of the display, as shown in FIG. 24, a screen pattern obtained by directly displaying the video signals having the reproduction envelope shown in FIG. 23 is shown in FIG. 25. Hatched portions in FIG. 25 show noise-bar portions corresponding to the hatches portions in FIG. 23. As is apparent from FIG. 25, noise-bar portions in a first-field image 301 are different from those in a second-field image 302. In other words, note that portions free from noise bars are complementary.

In the apparatus (FIG. 18) for m=2, of all reproduced video signals of the first and second fields, only signal components which are detected by the level detector 104 to have amplitudes exceeding the predetermined amplitude are used to perform interfield interpolation, thereby obtaining a one-field video signal. Therefore, a good reproduced image free from noise bars in principle can be obtained.

In the above embodiment, if n=7/2, i.e., if special reproduction is performed at a tape travel speed 7/2 times the recording speed. However, if $\underline{n}$ satisfies equation (1), a good image can be equally obtained.

Equation (1) is derived as follows. Assume that one-field video signal components are recorded in l tracks. In order to perform interfield interpolation using signal components which have amplitudes exceeding the predetermined amplitude and which are selected from the m-field reproduction video signals, and to obtain a one-field video signal, video data must be uniformly distributed in the l segments. For this reason, the reproduction envelope must have a period T defined by equation (2), as shown in FIG. 26:

$$T = m/l \tag{2}$$

Figure 26:
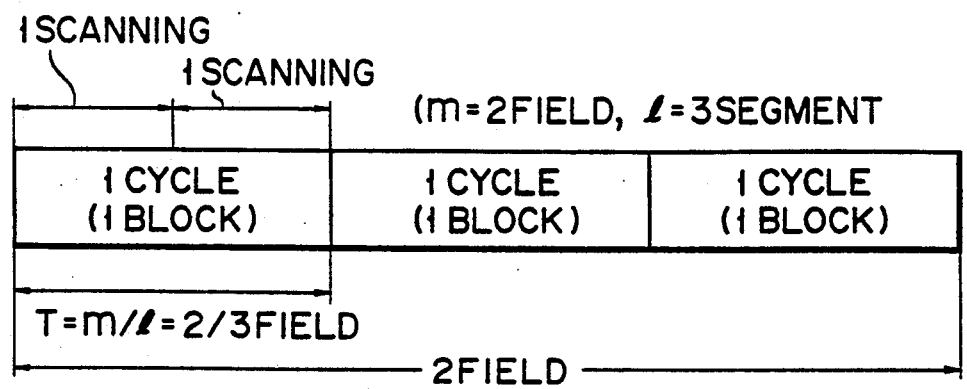
FIG. 26 is a view for explaining a cyclic characteristic required in the reproduction envelope.

FIG. 26 shows a case wherein m=2 (fields) and l=3 (segments) in the same manner as in FIG. 23. In FIG. 23, two successive scanning periods are defined as one period of the reproduction envelope, and one field is constituted by three segments. The period of the reproduction envelope is given as m/l=⅔ fields. In this case, $\underline{n}$ is defined by equation (3) below:

$$n = (A/m) + 1 \tag{3}$$

where A is the number of video tracks through which a trace of the rotary head crosses when the rotary head scans the magnetic tape $\underline{m}$ times. When the number A is an integer, the period T of equation (2) can be obtained.

Figure 27:
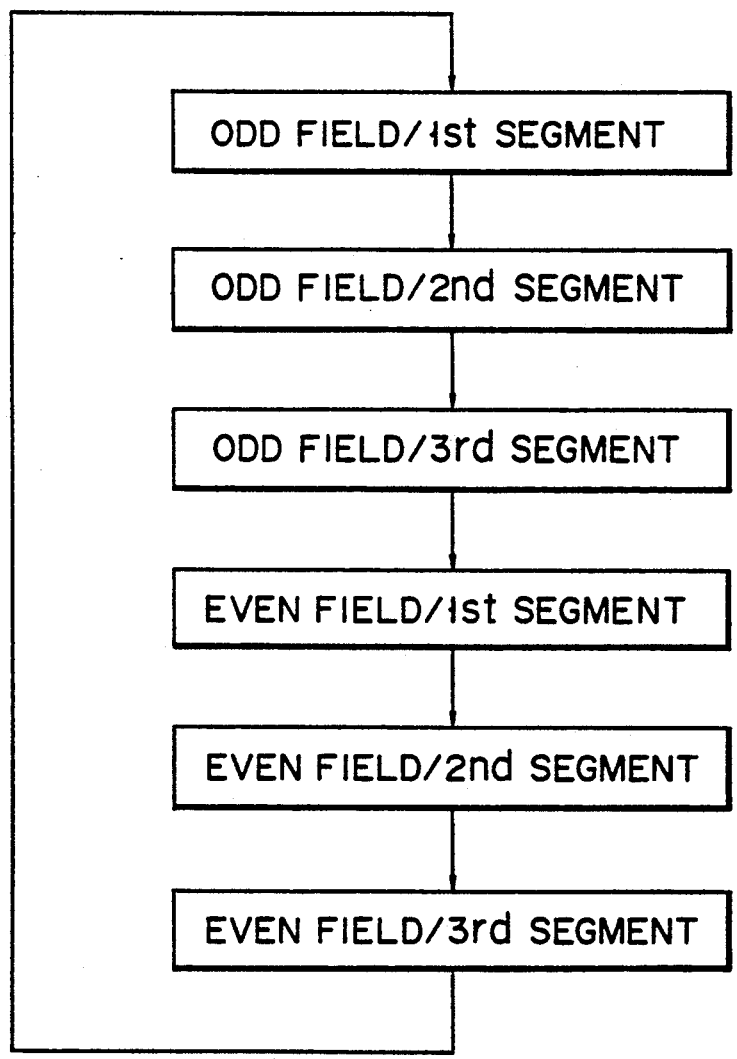
FIG. 27 is a view showing a reproduction state in which a video signal recorded by the segment recording scheme is reproduced at a normal speed.

When video signals are reproduced from the magnetic tape at a normal speed (i.e., the same tape travel speed as the recording speed) according to a segment recording system in which one-field video signal components are recorded on l tracks, the video signal components are sequentially reproduced from segments 1, 2, ... l of the first field, and then video signal components are sequentially reproduced from segments 1, 2, ... l of the second field, as shown in FIG. 27. These reproduction operations are then repeated to obtain an accurate image. Note that l=3 in FIG. 27. The same results as described above can be obtained when the video signal components are reproduced in an order of l, l−1, ... the first segment in FIG. 27.

Figure 28:
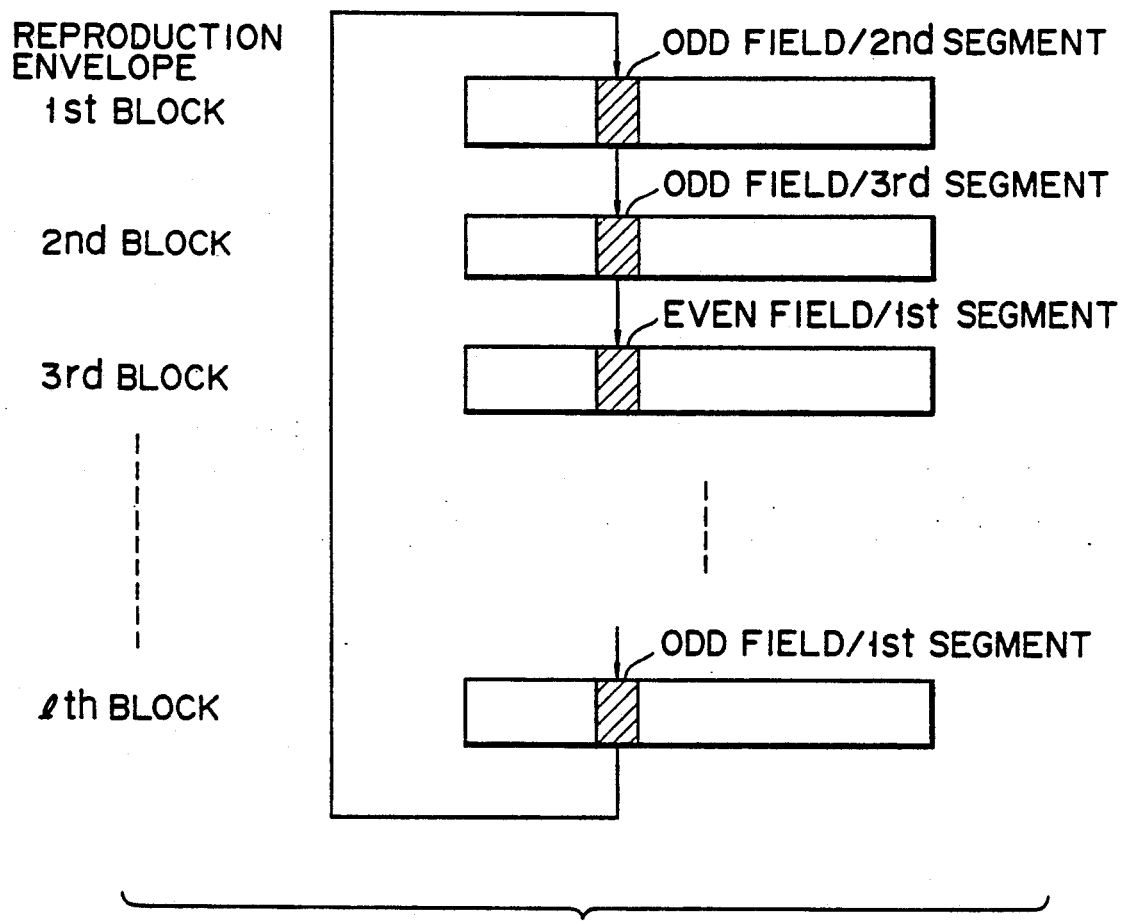
FIG. 28 is a view showing a reproduction state in which a video signal recorded by the segment recording scheme is reproduced in a special reproduction mode at a speed n times the normal speed.

Conditions for obtaining an accurate image are the same as described above when special reproduction is performed at a speed $\underline{n}$ times the normal speed. In this case, as shown in FIG. 28, l reproduction envelope blocks having the period T in the l field periods appear, as shown in FIG. 28. Therefore, the corresponding segments between the l reproduction envelope blocks must have a relationship to sequentially reproduce the first segment, the second segment, ... the lth segment of the odd field and the first segment, the second segment, ... the lth segment of the even field. In this case, A is defined as follows:

$$A = 2l \cdot k = m \pm 1 \quad (4)$$

therefore, $\underline{n}$ is given as follows:

$$\begin{aligned} n &= (A/m) + 1 \\ &= \{(2l \cdot k - m \pm 1)/m\} + 1 \\ &= (2l \cdot k \pm 1)/m \end{aligned} \quad (5)$$

the result is the same as equation (1).

According to the third embodiment, the components of one-field video signal which are recorded in the l tracks are reproduced at a speed $\underline{n}$ times the normal speed. Of all the resultant m-field reproduced signals, signal components having amplitudes exceeding the predetermined amplitude are used to obtain a one-field video signal by interfield interpolation. Since condition $n=(2l \cdot k \pm 1)$ is selected, the signal components having amplitudes exceeding the predetermined amplitude complementarily appear in the reproduction video signal components in the fields. Therefore, a good image substantially free from noise bars can be obtained by interfield-interpolated video signals.

What is claimed is:

1. An apparatus for reproducing a color video signal recorded in a recording medium by a time compressed integration signal format in a luminance signal, one of two types of chrominance signals beings selected by a predetermined rule in every horizontal scanning period, and a chrominance index signal representing the type of the selected one of chrominance signals are multiplexed along a time base, comprising:
    at least two cascade-connected delay means, each having one horizontal scanning period delay time, for delaying at least the chrominance signal in a signal reproduced from the recording medium;
    extracting means for extracting, from the reproduced signal, the chrominance index signal actually appearing in the reproduced signal;
    at least two cascade-connected latch means, connected to said extracting means, for holding extracted the chrominance index signal corresponding to output signals from said delay means;
    identifying means for identifying the type of chrominance signal desired to appear in each horizontal scanning period of the reproduced signal; and
    selecting means for selecting one of the reproduced signal and the output signals from said delay means in response to a combination of an output signal from said identifying means and output signals from said latch means so as to cause the identified type of chrominance signal to appear in the horizontal scanning period of the selected output signal.

2. An apparatus according to claim 1, wherein said extracting means comprises binarizing means for binarizing the reproduced signal, counting means for counting a horizontal sync signal in the reproduced signal, means for decoding an output signal form said counting means and generating a timing signal synchronized with the chrominance index signal in the reproduced signal, and means for latching an output signal from said binarizing means in response to the timing signal.

3. An apparatus according to claim 1, wherein said identifying means comprises means for generating a detection signal when the odd or even field is detected by the vertical sync signal in the reproduced signal, and means, reset in response to the detection signal, for counting the horizontal sync signal in the reproduced signal.

4. An apparatus according to claim 1, wherein said selecting means comprises a read-only memory for generating a selection control signal corresponding to the combination when said read-only memory receives as address data an output signal from said identifying means and output signals from said latch means, and a selector for selecting the chrominance signal in the reproduced signal and the output signals from said delay means.

5. An apparatus for reproducing a color video signal recorded in a recording medium by a time compressed integration signal format in a luminance signal, one of two types of chrominance signals being selected by a predetermined rule in every horizontal scanning period, and a chrominance index signal representing the type of the selected one of chrominance signals are multiplexed along a time base, comprising:
    at least two first cascade-connected delay means, each having one horizontal scanning period delay time for delaying at least the chrominance signal in a signal reproduced from the recording medium;
    extracting means for extracting, from the reproduced signal, the chrominance index signal actually appearing in the reproduced signal;
    at least two cascade-connected latch means, connected to said extracting means, for holding extracted the chrominance index signals corresponding to output signals from said first delay circuits;
    identifying means for identifying the type of chrominance signal desired to appear in each horizontal scanning period of the reproduced signal;
    first selecting means for selecting one of the reproduced signal and the output signals from said first delay means in response to a combination of an output signal from said identifying means and output signals from said latch means so as to cause the identified type of chrominance signal to appear in the horizontal scanning period of the selected output signal;
    second delay means for delaying an output signal from said first selecting means by a predetermined time of at least two horizontal scanning periods; and second selecting means for selecting an output signal from said second delay means when all types of chrominance signals in the reproduced signal and the chrominance signals output from said first delay means do not coincide with the type identified by said identifying means, and, otherwise, for selecting an output signal from said first selecting means.

6. An apparatus according to claim 5, wherein said extracting means comprises binarizing means for binarizing the reproduced signal, counting means for counting a horizontal sync signal in the reproduced signal, means for decoding an output signal from said counting means and generating a timing signal synchronized with the chrominance index signal in the reproduced signal, and means for latching an output signal from said binarizing means in response to the timing signal.

7. An apparatus according to claim 5, wherein said identifying means comprises means for generating a detection signal when the odd or even field is detected by the vertical sync signal in the reproduced signal, and means, reset in response to the detection signal, for counting the horizontal sync signal in the reproduced signal.

8. An apparatus according to claim 5, wherein said second selecting means comprises a read-only memory for generating a selection control signal corresponding to the combination when said read-only memory receives as address data an output signal from said identifying means and output signals from said latch means, and a selector for selecting an output signal from said first selecting means and the output signals from said first and second delay means.

9. An apparatus for reproducing a color video signal recorded in a recording medium by a time compressed integration signal format in a luminance signal, one of two types of chrominance signals being selected by a predetermined rule in every horizontal scanning period, and a chrominance index signal representing the type of the selected one of chrominance signals are multiplexed along a time base, comprising:

storage means for storing at least one field of a signal reproduced from the recording medium;

means for writing the reproduced signal in said storage means;

write address correcting means for performing correction for shifting a write address of a chrominance signal in the reproduced signal of one of odd and even fields from a write address of a chrominance signal in the reproduced signal of the other field by a predetermined amount when the reproduced signal is written in the storage means;

means for reading out the reproduced signal from the storage means; and read address correcting means for performing correction for shifting a read address of a chrominance signal in the reproduced signal of one of the odd and even fields from a read address of a chrominance signal of the reproduced signal of the other field by a predetermined amount when the reproduced signal is read out from the storage means;

wherein said write address correcting means comprises: frequency-dividing means, reset in response to a vertical sync signal in the reproduced signal, for frequency-dividing a horizontal sync signal and generating a signal for identifying the type of chrominance signal desired to appear in each horizontal scanning period of the reproduced signal;

means for determining a coincidence/noncoincidence between the type of chrominance signal identified by an output signal from said frequency-dividing means and the type of chrominance signal designated by the chrominance index signal in the reproduced signal; and means for shifting the write address of the chrominance signal in the reproduced signal of said one field from the write address of the chrominance signal of the reproduced signal of said other field by the predetermined amount when said determining means determines the noncoincidence.

10. An apparatus according to claim 9, wherein said storage means comprises at least first and second field memories, said writing means alternately writes the reproduced signals every field in said first and second field memories, and said reading means alternately reads out the reproduced signals from said first and second field memories.

11. An apparatus according to claim 9, wherein said write address correcting means comprises means for shifting the write address of the chrominance signal in the reproduced signal of said one field from the write address of the chrominance signal of the reproduced signal of said other field by the predetermined amount when the type of chrominance signal supposed to appear in each horizontal scanning period of the reproduced signal does not coincide with the type of chrominance signal represented by the chrominance index signal in the reproduced signal.

12. An apparatus according to claim 9, wherein said storage means comprises at least one field memory which also serves as a time base corrector for the reproduced signal.

13. An apparatus for reproducing a color video signal recorded in a recording medium by a time compressed integration signal format in a luminance signal, one of two types of chrominance signals being selected by a predetermined rule in every horizontal scanning period, and a chrominance index signal representing the type of the selected one of chrominance signals are multiplexed along a time base, comprising:

identifying means for identifying a type of chrominance signal desired to appear during each horizontal scanning period of a signal reproduced from the recording medium;

determining means for determining a coincidence/noncoincidence between a type of chrominance signal of the reproduced signal which is represented by the chrominance index signal and the type of chrominance signal identified by said identifying means; and means for correcting the chrominance signal in the reproduced signal so as to obtain the type of chrominance signal identified by said identifying means during each horizontal scanning period of the corrected chrominance signal when said determining means determines the noncoincidence.

* * * * *